US012632061B2

(12) United States Patent
Taniguchi

(10) Patent No.: US 12,632,061 B2
(45) Date of Patent: May 19, 2026

(54) MOBILE APPARATUS, METHOD FOR DETERMINING POSITION, AND NON-TRANSITORY RECORDING MEDIUM

(71) Applicant: Asuto Taniguchi, Kanagawa (JP)

(72) Inventor: Asuto Taniguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 21 days.

(21) Appl. No.: 18/746,040

(22) Filed: Jun. 18, 2024

(65) Prior Publication Data
US 2024/0427343 A1 Dec. 26, 2024

(30) Foreign Application Priority Data

Jun. 20, 2023 (JP) .................................. 2023-100886
Mar. 11, 2024 (JP) .................................. 2024-036878

(51) Int. Cl.
*G05D 1/229* (2024.01)
*G05D 1/242* (2024.01)
(Continued)

(52) U.S. Cl.
CPC ........... *G05D 1/2297* (2024.01); *G05D 1/242* (2024.01); *G05D 1/243* (2024.01); *G05D 1/2464* (2024.01);
(Continued)

(58) Field of Classification Search
CPC .... G05D 1/2297; G05D 1/242; G05D 1/2464; G05D 1/248; G05D 1/243; G05D 2111/52; G05D 2111/14
(Continued)

(56) References Cited

U.S. PATENT DOCUMENTS 11,747,819 B1 * 9/2023 Ebrahimi Afrouzi ........................ G05D 1/0221 701/423
2021/0096569 A1 4/2021 Tanaka et al.
(Continued)

FOREIGN PATENT DOCUMENTS

JP 2006-018543 A 1/2006
JP 4984650 B2 7/2012
(Continued)

OTHER PUBLICATIONS

Peter Biber, et al., "The normal distributions transform: a new approach to laser scan matching", Proceedings 2003 IEEE/RSJ International Conference on Intelligent Robots and Systems, pp. 1-6 (2003).
(Continued)

*Primary Examiner* — Mahmoud S Ismail
(74) *Attorney, Agent, or Firm* — XSENSUS LLP

(57) ABSTRACT

A mobile apparatus includes circuitry to control the mobile apparatus to perform teaching travel and autonomous travel, generate; for each of nodes on a travel route independently for external sensors, calculation information for calculating a deviation between a node passed in the teaching travel and a point passed in the autonomous travel; store in the memory the calculation information in association with the node and the external sensor; calculate, for each node independently for the external sensors, the deviation based on the calculation information and a of the extern sensor value in the autonomous travel; determine, for each node independently for the external sensors, the calculated deviation as a position and posture of the node with reference to the position and posture of the mobile apparatus; integrate the positions and postures of the node determined independently for the
(Continued)

external sensors; and control the mobile apparatus to autonomously travel.

20 Claims, 24 Drawing Sheets

(51) Int. Cl.

| | |
|---|---|
| *G05D 1/243* | (2024.01) |
| *G05D 1/246* | (2024.01) |
| *G05D 1/248* | (2024.01) |
| *G05D 111/10* | (2024.01) |
| *G05D 111/50* | (2024.01) |

(52) U.S. Cl.
CPC .......... *G05D 1/248* (2024.01); *G05D 2111/14* (2024.01); *G05D 2111/52* (2024.01)

(58) Field of Classification Search
USPC ........................................................ 701/25
See application file for complete search history.

(56) References Cited

U.S. PATENT DOCUMENTS

| | | | | |
|---|---|---|---|---|
| 2021/0220996 A1* | 7/2021 | Passot | .................... | G05D 1/628 |
| 2022/0024486 A1* | 1/2022 | Scott | ................. | B60W 60/0025 |
| 2022/0212342 A1* | 7/2022 | Laurent | .................... | B25J 9/163 |
| 2024/0329220 A1* | 10/2024 | Hrabe | .................... | G05D 1/247 |
| 2024/0353843 A1* | 10/2024 | Szatmary | ............. | G05D 1/0257 |

FOREIGN PATENT DOCUMENTS

| | | |
|---|---|---|
| JP | 2018-121121 A | 8/2018 |
| JP | 2018-206004 A | 12/2018 |
| JP | 2020-175890 A | 10/2020 |
| JP | 2021-124898 A | 8/2021 |
| JP | 2021-191658 A | 12/2021 |

OTHER PUBLICATIONS

Extended European Search Report issued Oct. 24, 2024 in European Patent Application No. 24181848.3, 10 pages.
Christoph Sprunk et al., "Lidar-based Teach-and-Repeat of Mobile Robot Trajectories", 2013 IEEE/RSJ International Conference on Intelligent Robots and Systems (IROS), Nov. 3-7, 2013, 6 pages, XP032537360.

* cited by examiner

TEACHING TRAVEL

AUTONOMOUS TRAVEL

Figure 6:
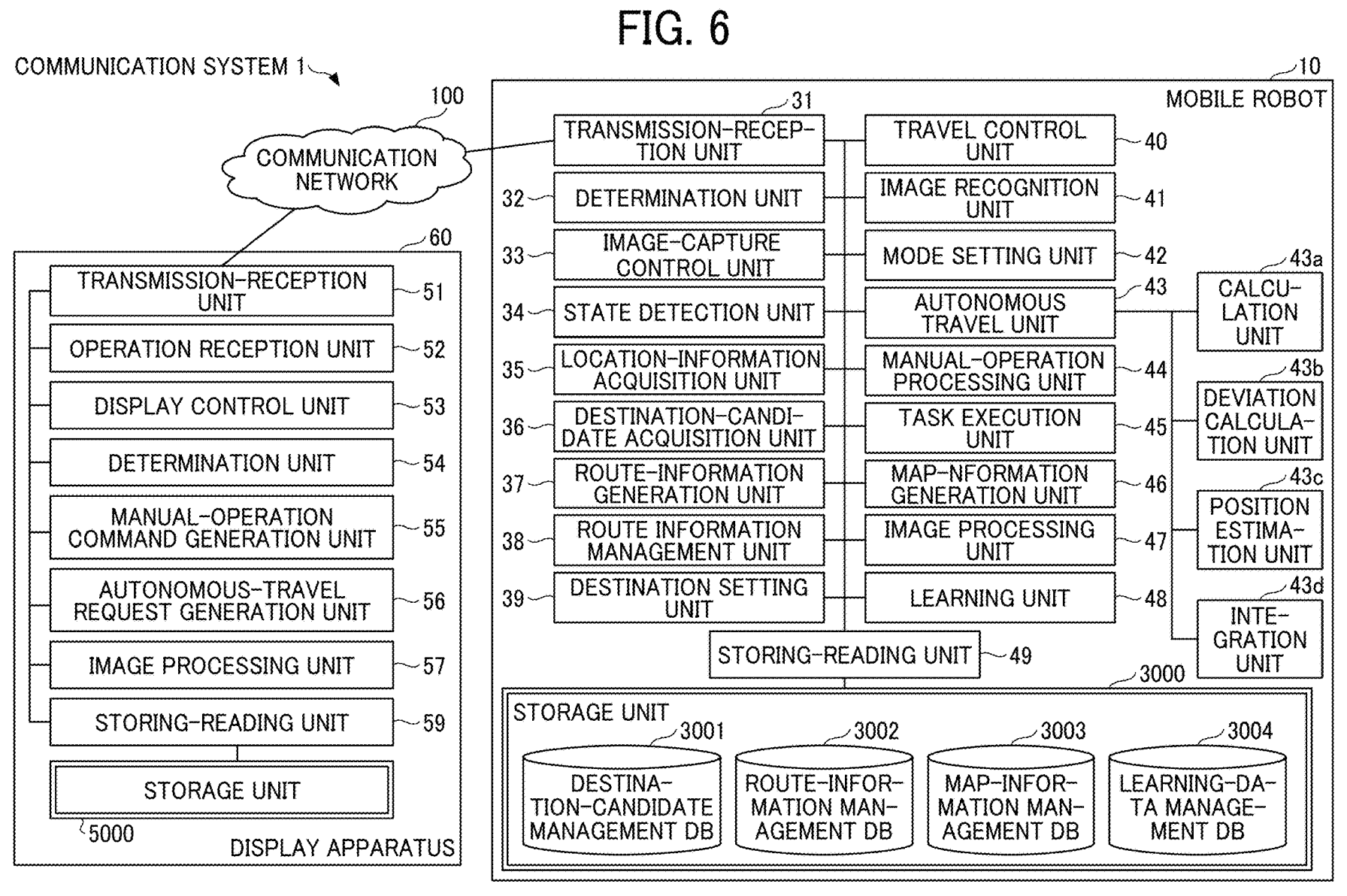

COMMUNICATION SYSTEM 1

MOBILE ROBOT 10

TRANSMISSION-RECEPTION UNIT 31

TRAVEL CONTROL UNIT 40

IMAGE RECOGNITION UNIT 41

MODE SETTING UNIT 42

AUTONOMOUS TRAVEL UNIT 43

CALCULATION UNIT 43a

DEVIATION CALCULATION UNIT 43b

POSITION ESTIMATION UNIT 43c

INTEGRATION UNIT 43d

MANUAL-OPERATION PROCESSING UNIT 44

TASK EXECUTION UNIT 45

MAP-INFORMATION GENERATION UNIT 46

IMAGE PROCESSING UNIT 47

LEARNING UNIT 48

DETERMINATION UNIT 32

IMAGE-CAPTURE CONTROL UNIT 33

STATE DETECTION UNIT 34

LOCATION-INFORMATION ACQUISITION UNIT 35

DESTINATION-CANDIDATE ACQUISITION UNIT 36

ROUTE-INFORMATION GENERATION UNIT 37

ROUTE INFORMATION MANAGEMENT UNIT 38

DESTINATION SETTING UNIT 39

STORING-READING UNIT 49

STORAGE UNIT 3000

DESTINATION-CANDIDATE MANAGEMENT DB 3001

ROUTE-INFORMATION MANAGEMENT DB 3002

MAP-INFORMATION MANAGEMENT DB 3003

LEARNING-DATA MANAGEMENT DB 3004

COMMUNICATION NETWORK 100

DISPLAY APPARATUS 60

TRANSMISSION-RECEPTION UNIT 51

OPERATION RECEPTION UNIT 52

DISPLAY CONTROL UNIT 53

DETERMINATION UNIT 54

MANUAL-OPERATION COMMAND GENERATION UNIT 55

AUTONOMOUS-TRAVEL REQUEST GENERATION UNIT 56

IMAGE PROCESSING UNIT 57

STORING-READING UNIT 59

STORAGE UNIT 5000

FIG. 7

DESTINATION-CANDIDATE MANAGEMENT TABLE

SITE ID: M001

| CANDIDATE ID | LOCATION | CAPTURED IMAGE DATA |
|---|---|---|
| P001 | (35.45XXX31, 139.38YYY86) | AAA.jpg |
| P002 | (35.45XXX91, 139.38YYY01) | BBB.jpg |
| P003 | (35.45XXX26, 139.38YYY62) | CCC.jpg |
| P004 | (35.45XXX46, 139.38YYY89) | DDD.jpg |
| P005 | (35.45XXX83, 139.38YYY61) | EEE.jpg |
| ... | ... | ... |

FIG. 8

ROUTE-INFORMATION MANAGEMENT TABLE

SITE ID: M001

| ROUTE ID | ROUTE |
|---|---|
| R001 | P001→P002→P003→P004→P005····· |
| R002 | P018→P019→P020 |
| ... | ... |

FIG. 9

ROUTE ID R001

| NODE | FIRST LOCAL MAP | SECOND LOCAL MAP |
|---|---|---|
| $v_1$ | map_v1_1.dat | map_v1_2.dat |
| $v_2$ | map_v2_1.dat | map_v2_2.dat |
| ... | ... | ... |

NODE $v_j$

EDGE $e_{ij}$ $v_i$

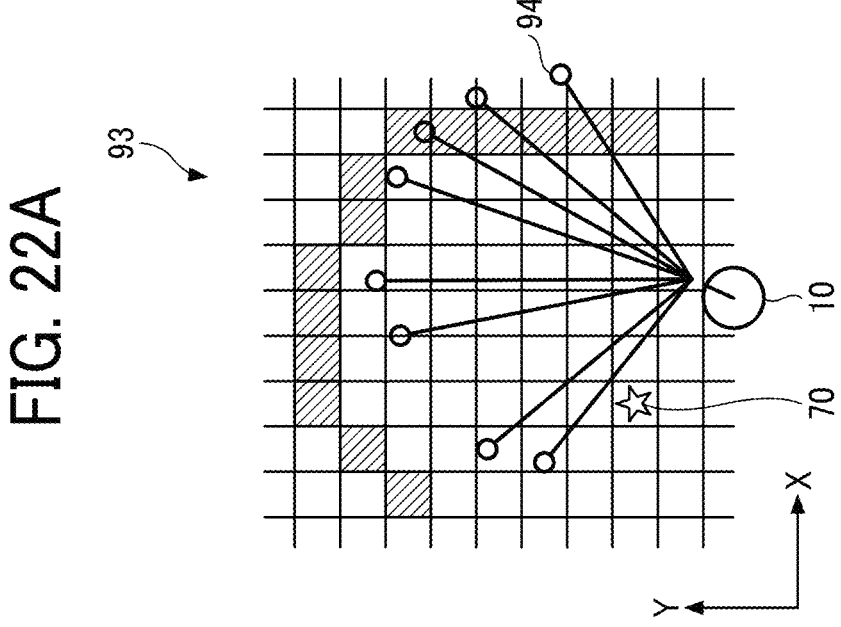

FIG. 23

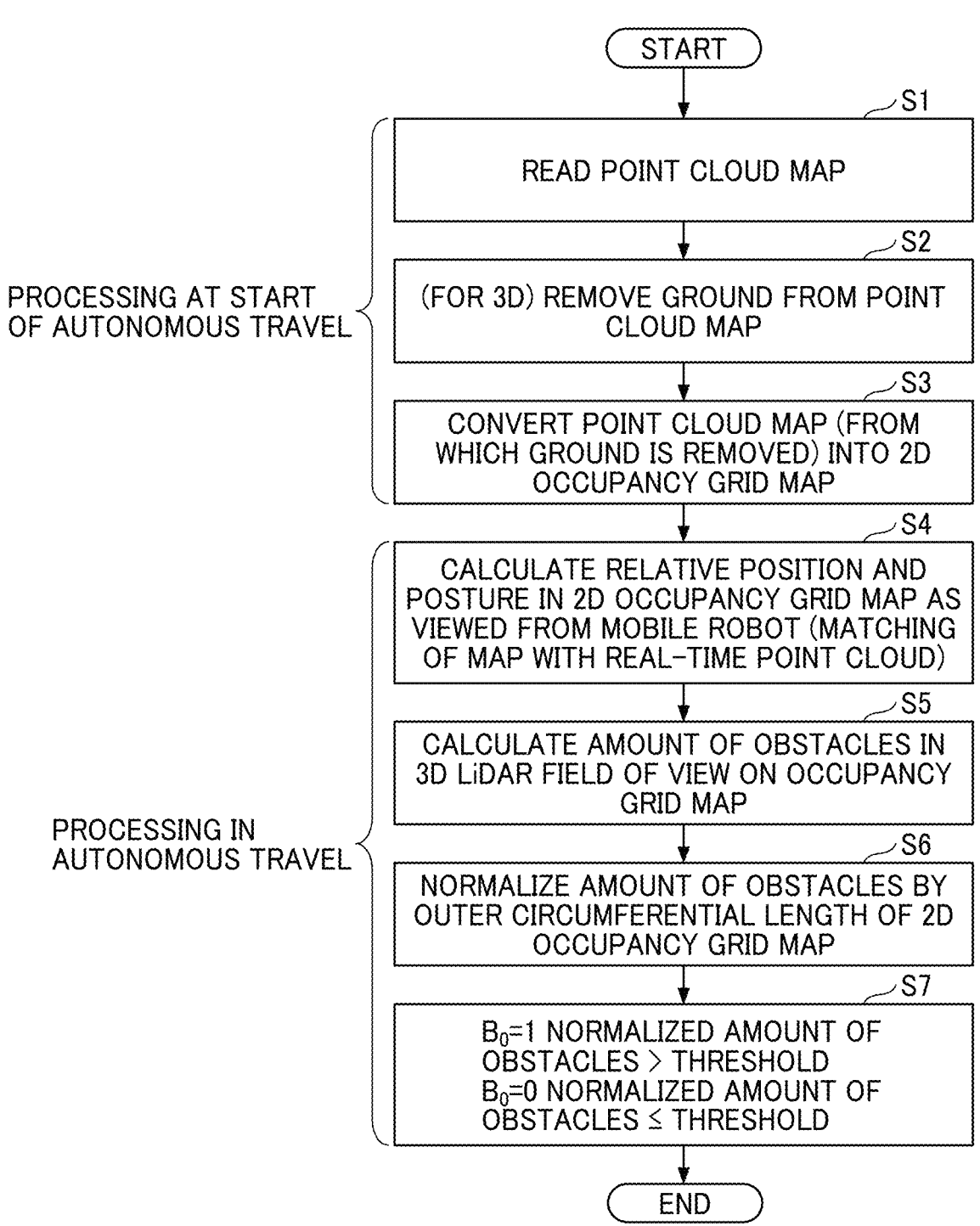

PROCESSING AT START
OF AUTONOMOUS TRAVEL

START

READ POINT CLOUD MAP — S1

(FOR 3D) REMOVE GROUND FROM POINT CLOUD MAP — S2

CONVERT POINT CLOUD MAP (FROM WHICH GROUND IS REMOVED) INTO 2D OCCUPANCY GRID MAP — S3

PROCESSING IN AUTONOMOUS TRAVEL

CALCULATE RELATIVE POSITION AND POSTURE IN 2D OCCUPANCY GRID MAP AS VIEWED FROM MOBILE ROBOT (MATCHING OF MAP WITH REAL-TIME POINT CLOUD) — S4

CALCULATE AMOUNT OF OBSTACLES IN 3D LiDAR FIELD OF VIEW ON OCCUPANCY GRID MAP — S5

NORMALIZE AMOUNT OF OBSTACLES BY OUTER CIRCUMFERENTIAL LENGTH OF 2D OCCUPANCY GRID MAP — S6

$B_0=1$ NORMALIZED AMOUNT OF OBSTACLES > THRESHOLD
$B_0=0$ NORMALIZED AMOUNT OF OBSTACLES ≤ THRESHOLD — S7

END

MOBILE APPARATUS, METHOD FOR DETERMINING POSITION, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2023-100886, filed on Jun. 20, 2023, and 2024-036878, filed on Mar. 11, 2024, in the Japan Patent Office, the entire disclosure of which is hereby incorporated by reference herein.

BACKGROUND

Technical Field

The present disclosure relates to a mobile apparatus, a method for determining a position, and a carrier medium.

Related Art

A leak or an abnormality of structures (e.g., piping, meters, and valves) installed outdoors of a facility such as a chemical plant has been generally inspected visually by an inspector patrolling the locations of the structures. Currently, technologies using autonomous mobile apparatuses (may be referred to as "mobile robots" in the following description) have been developed for performing the above-described inspection work unattended. A mobile robot can autonomously travel to a destination by using a global navigation satellite system (GNSS) positioning technology in an outdoor environment and by using a simultaneous localization and mapping (SLAM) technology in a relatively small indoor environment.

Some technologies for enabling a mobile robot to travel seamlessly indoors and outdoors are known in the art. For example, creating an environment map before performing autonomous travel is disclosed. The environment map is generated based on topographical data obtained as a result of distance measurement by a range sensor, using the SLAM technology. In autonomous travel, self-position estimation (self-localization) is performed by map matching between the environment map and the distance data at each time point.

SUMMARY

In one aspect, a mobile apparatus includes circuitry to: control the mobile apparatus to perform teaching travel and autonomous travel on a travel route, the teaching travel in which the mobile apparatus stores in a memory a position and posture of the mobile apparatus traveling on the travel route under control by a manual operation, the autonomous travel in which the mobile apparatus autonomously travels on the travel route; generate, for each of nodes on the travel route independently for each of multiple external sensors, calculation information used for calculating a deviation between a node passed in the teaching travel and a point passed in the autonomous travel; store in the memory the calculation information in association with the node and the external sensor; calculate, for each node independently for each of the multiple external sensors, the deviation based on the calculation information and a sensor value of the external sensor obtained in the autonomous travel; determine, for each node independently for each of the multiple external sensors, the calculated deviation as a position and posture of the node on the travel route with reference to the position and posture of the mobile apparatus; integrate, for each node, the positions and postures of the node determined independently for each of the multiple external sensors; and control the mobile apparatus to autonomously travel on the travel route based on the integrated position and posture of each node on the travel route.

Another aspect concerns a method for determining a position of a mobile apparatus. The method includes controlling the mobile apparatus to perform teaching travel in which the mobile apparatus stores in a memory a position and posture of the mobile apparatus traveling on a travel route under control by a manual operation; generating, for each of nodes on the travel route independently for each of multiple external sensors, calculation information used for calculating a deviation between a node passed in the teaching travel and a point passed in autonomous, the autonomous travel in which the mobile apparatus autonomously travels on the travel route; storing in the memory the calculation information in association with the node and the external sensor; calculating, for each node independently for each of the multiple external sensors, the deviation based on the calculation information and a sensor value of the external sensor obtained in the autonomous travel; determining, for each node independently for each of the multiple external sensors, the calculated deviation as a position and posture of the node on the travel route with reference to the position and posture of the mobile apparatus; integrating, for each node, the positions and postures of the node determined independently for each of the multiple external sensors; and controlling the mobile apparatus to autonomously travel on the travel route based on the integrated position and posture of each node on the travel route.

Another aspect concerns a non-transitory recording medium storing a plurality of program codes which, when executed by one or more processors, causes the one or more processors to perform a method. The method includes controlling a mobile apparatus to perform teaching travel in which the mobile apparatus stores in a memory a position and posture of the mobile apparatus traveling on a travel route under control by a manual operation; generating, for each of nodes on the travel route independently for each of multiple external sensors, calculation information used for calculating a deviation between a node passed in the teaching travel and a point passed in autonomous, the autonomous travel in which the mobile apparatus autonomously travels on the travel route; storing in the memory the calculation information in association with the node and the external sensor; calculating, for each node independently for each of the multiple external sensors, the deviation based on the calculation information and a sensor value of the external sensor obtained in the autonomous travel; determining, for each node independently for each of the multiple external sensors, the calculated deviation as a position and posture of the node on the travel route with reference to the position and posture of the mobile apparatus; integrating, for each node, the positions and postures of the node determined independently for each of the multiple external sensors; and controlling the mobile apparatus to autonomously travel on the travel route based on the integrated position and posture of each node on the travel route.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 4A to 4C are each an exterior perspective view of an example of a mobile robot as a mobile apparatus;

FIG. 6 is a block diagram illustrating an example of a functional configuration of the communication system illustrated in FIG. 3;

FIG. 7 is a conceptual diagram illustrating an example of a destination-candidate management table;

FIG. 8 is a conceptual diagram illustrating an example of route-information management table;

FIG. 9 is a conceptual diagram illustrating an example of map-information management table;

FIG. 11 is a diagram illustrating an example of an operation screen;

FIG. 15 is a diagram illustrating an example of a selection screen;

FIG. 16 is a diagram illustrating an example of a selection screen;

FIGS. 22A and 22B are diagrams each schematically illustrating matching calculation between a two-dimensional occupancy grid map and a scanning point cloud of a two-dimensional light detection and ranging (2D LiDAR);

FIG. 23 is a flowchart of an example process of estimated reliability evaluation based on the amount of obstacles;

Figure 1A:
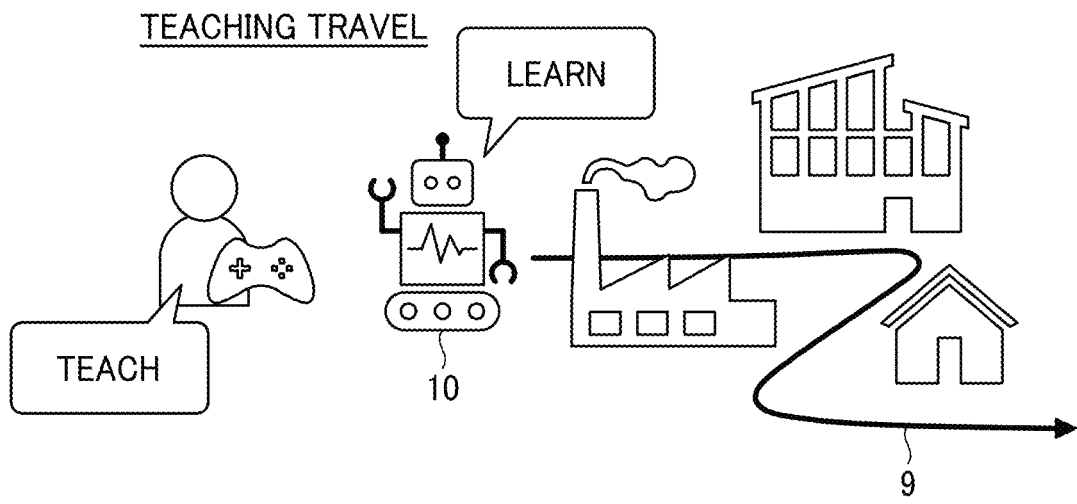
FIGS. 1A and 1B are conceptual diagrams of teaching travel and autonomous travel in a comparative technology.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of a mobile robot (mobile apparatus) and a position estimation method performed by the mobile apparatus according to example embodiments of the present disclosure, with reference to the attached drawings.

First Embodiment

Supplemental Description about Positioning Technology

Autonomous travel technologies (e.g., SLAM technologies) using a map generated using the GNSS positioning technology and the LiDAR technology have been developed. To generate the map, the GNSS positioning technology is used in an open outdoor environment, and a range sensor or a camera is used in a relatively narrow indoor environment.

If a map is generated in an environment in which the GNSS positioning accuracy is continuously reduced, the generated map may be distorted. In such a case, the accuracy of the position and posture estimation of the mobile robot in autonomous travel is reduced. For example, multiple sensors are used for map generation and self-localization in order to estimate the position and posture with high accuracy even in a vast place where the GNSS positioning accuracy is not necessarily high.

In order to estimate the position and posture with high accuracy, some technologies have been proposed to achieve accurate environment map generation and self-localization using multiple sensors such as a GNSS, a LiDAR sensor, and a camera. Many of such technologies adopt a method of "reconstructing the entire environment into one two-dimensional or three-dimensional map and determining the location of a mobile robot in the map."

However, even with multiple sensors, it is still difficult to accurately reconstruct the environment without distortion, and often requires manual intervention to, for example, correct the map. On an inaccurate map that is, for example, distorted, it is possible that a deviation occurs in the respective self-localization results by the sensors, which leads to instability of traveling.

A description is given below of an example of estimation (determination) of the position and posture using the GNSS and LiDAR.

If the positioning accuracy of the GNSS is satisfactory, the distortion in the map generated using LiDAR can be corrected to match the GNSS coordinate system, thereby generating an accurate map. However, when the GNSS positioning accuracy is continuously low, the distortion in the map generated using LiDAR is not appropriately corrected, and that portion of the map remains inaccurate.

Further, if GNSS positioning is accurate by chance at a place where the map is generated using LiDAR in autonomous travel, there arises a gap between the self-localization result obtained by matching scan data of LiDAR with the map and the GNSS positioning result. In that case, the mobile robot autonomously travels using, as a final estimation result, any one of these self-localization results or an intermediate result, which may lead to inaccurate traveling. Alternatively, an operator manually corrects the distorted portion of the map to match the GNSS coordinates to prevent incorrect traveling.

In the present embodiment, even in a vast place where the GNSS positioning accuracy is not necessarily high, a mobile apparatus can autonomously travel with high accuracy without manual correction of the map. Further, this enables the mobile apparatus to autonomously travel on a travel route on which the mobile apparatus is controlled to travel by a manual operation by an operator who does not have expertise.

Figure 1B:
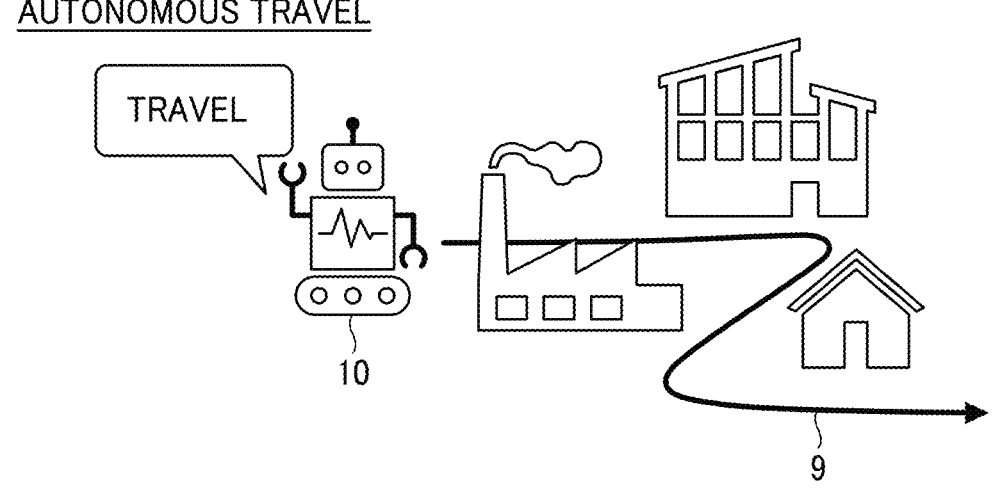

FIGS. 1A and 1B are conceptual diagrams of teaching travel and autonomous travel in a comparative technology. The comparative technology is presented to be compared with the present embodiment to clarify the processing according to the present embodiment. The comparative technology is not a prior art. The term "teaching" refers to the operator's manual control for causing a mobile robot 10 (mobile apparatus) to travel to learn the travel route 9.

As illustrated in FIG. 1A, first, the operator manually controls the mobile robot 10 to travel as teaching travel. The mobile robot 10 stores the travel route 9 while generating an environment map. Subsequently, as illustrated in FIG. 1B, the mobile robot 10 autonomously travels on the stored travel route 9. In the comparative technology, the robot 1 travels on the travel route 9 as described above but does not store, during the teaching travel, local maps of waypoints described below.

Figures 2A, 2B:
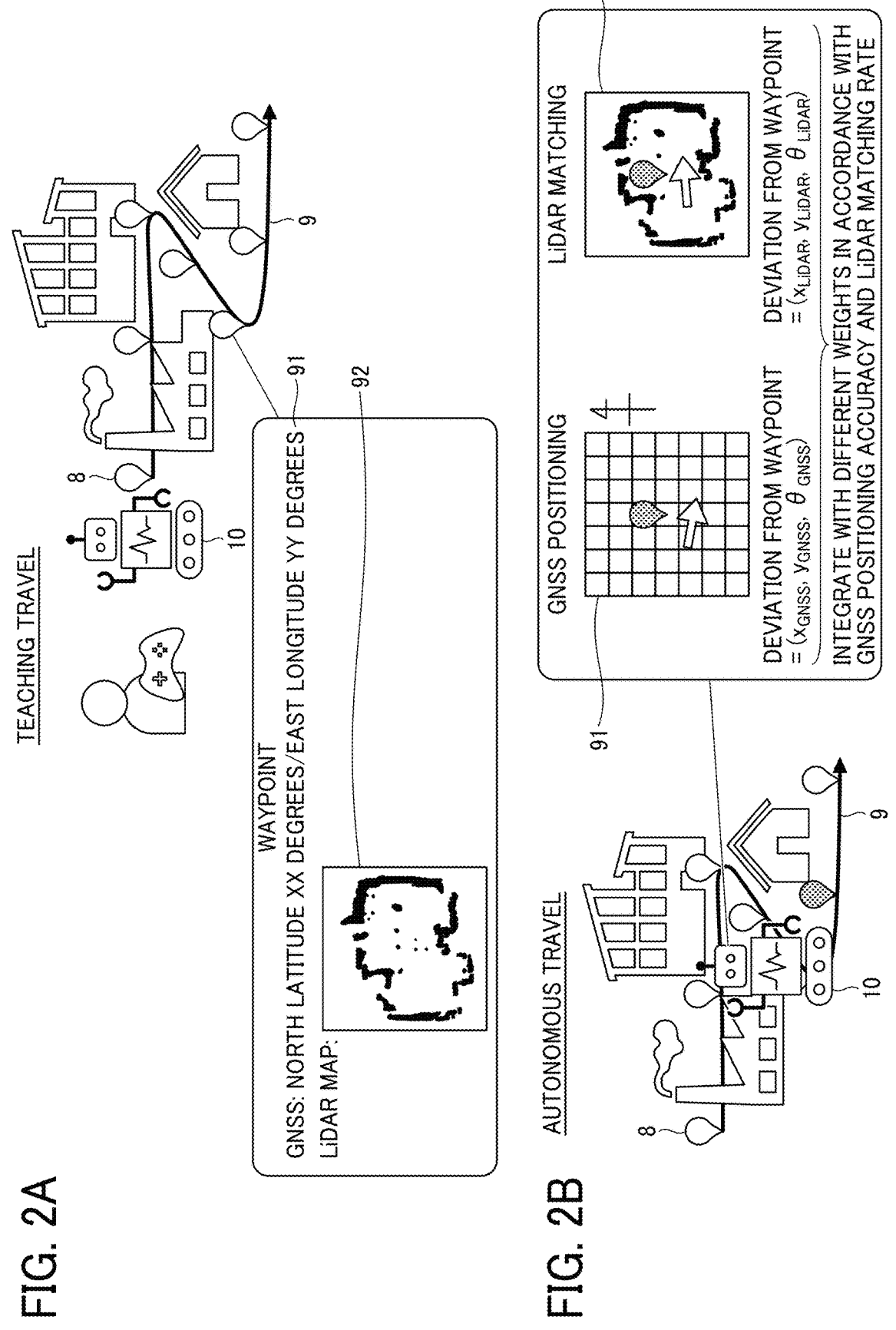
FIG. 2A is a diagram schematically illustrating waypoints stored during teaching travel.
FIG. 2B is a diagram explaining a method of estimating a position and a posture in autonomous travel.

FIG. 2A is a diagram schematically illustrating waypoints 8 stored during the teaching travel in the present embodiment. The mobile robot 10 according to the present embodiment generates a topological map during teaching travel. The topological map is a map representation in a graph format that includes waypoints 8 (nodes to be described later) discretely present on the travel route and edges representing the relative positions among the waypoints 8. Each waypoint 8 is associated with multiple local maps 91 and 92 which are independently generated by multiple sensors as the waypoint 8 being an origin.

FIG. 2B is a diagram illustrating a method of estimating a position and a posture during the autonomous travel. During the autonomous travel, the mobile robot 10 calculates, as the position and posture of the waypoint 8, a deviation of the position and posture of the mobile robot 10 estimated from the position and posture based on the local maps associated with the waypoint 8 and the sensor value (the measurement value of the sensor) detected by the sensor during autonomous travel. Since the mobile robot 10 sets its own position as the origin in autonomous travel, this deviation represents the position and posture of the waypoint 8 as viewed from the mobile robot 10 in autonomous travel. The term "viewed" refers to using the position and posture of the mobile robot 10 as references.

The mobile robot 10 integrates the deviation amount (that is, the position of the waypoint 8 viewed from the mobile robot 10) while weighting the position and posture by the GNSS and the position and posture by the SLAM in accordance with the positioning accuracy of the GNSS and the positioning accuracy of the LiDAR.

As described above, the mobile robot 10 according to the present embodiment has local maps independent for multiple sensors in a topological map format. The mobile robot 10 calculates the reliability of positions and postures of itself estimated independently for each of multiple sensors, based on the sensor values obtained in teaching travel and autonomous travel. The mobile robot 10 then integrates the self-positions and self-postures into the final position and posture with weighting according to the reliability. This obviates the necessity to manually correct the map to make the respective position estimation results by the sensors consistent. Accordingly, even if the positioning accuracy of any of the sensors is reduced in the route teaching phase, highly accurate autonomous travel can be achieved.

Terms

Teaching travel refers to the travel, under the manual operation of a controller by the operator, of the mobile robot 10 on the travel route on which the mobile robot 10 is to autonomously travel so that the mobile robot 10 stores the positions and postures while traveling the travel route. Autonomous travel refers to automatic travel of the mobile robot 10 on the travel route or along the travel route learned in the teaching travel.

An external sensor is an external environmental sensor that measures the environment in which the mobile robot 10 is placed (that is, outside the mobile robot 10). Examples of the external sensor include a GNSS antenna, a LiDAR sensor, and a camera that acquires distance information. An internal sensor is a sensor that measures the state of the mobile robot 10 (that is, the inside the mobile robot 10). Examples of the internal sensor include a speed sensor, an accelerometer, an angular velocity sensor, and a direction sensor.

Nodes are points that are parts of the travel route. In the present embodiment, the nodes are also referred to waypoints.

Location information is information specifying the location of the mobile robot 10 with reference to the origin, and a posture is information specifying the direction of the mobile robot 10 with reference to a reference direction. The posture may be a posture in a three-dimensional space or a two-dimensional space.

Calculation information is information that enables calculation of a deviation between a node passed in the teaching travel and a point passed in the autonomous travel. The calculation information may differ depending on the external sensor. In GNSS, the calculated information is the position and posture in the GNSS coordinate system. In LiDAR, the calculated information is a two-dimensional occupancy grid map. In the present embodiment, the calculation information is described by the term "local map."

The local map is a map of at least a part of the travel route and covers not the entire travel route. The local map may be a map of a range measured by the external sensor in the environment with the waypoint 8 as the origin.

Integration refers to merging two or more things into one.

The position and posture with reference to the mobile robot 10 are the position and posture relative to the position and posture of the mobile robot 10. In the present embodiment, the expression "viewed" from the mobile robot 10 may be used.

System Configuration

Figure 3:
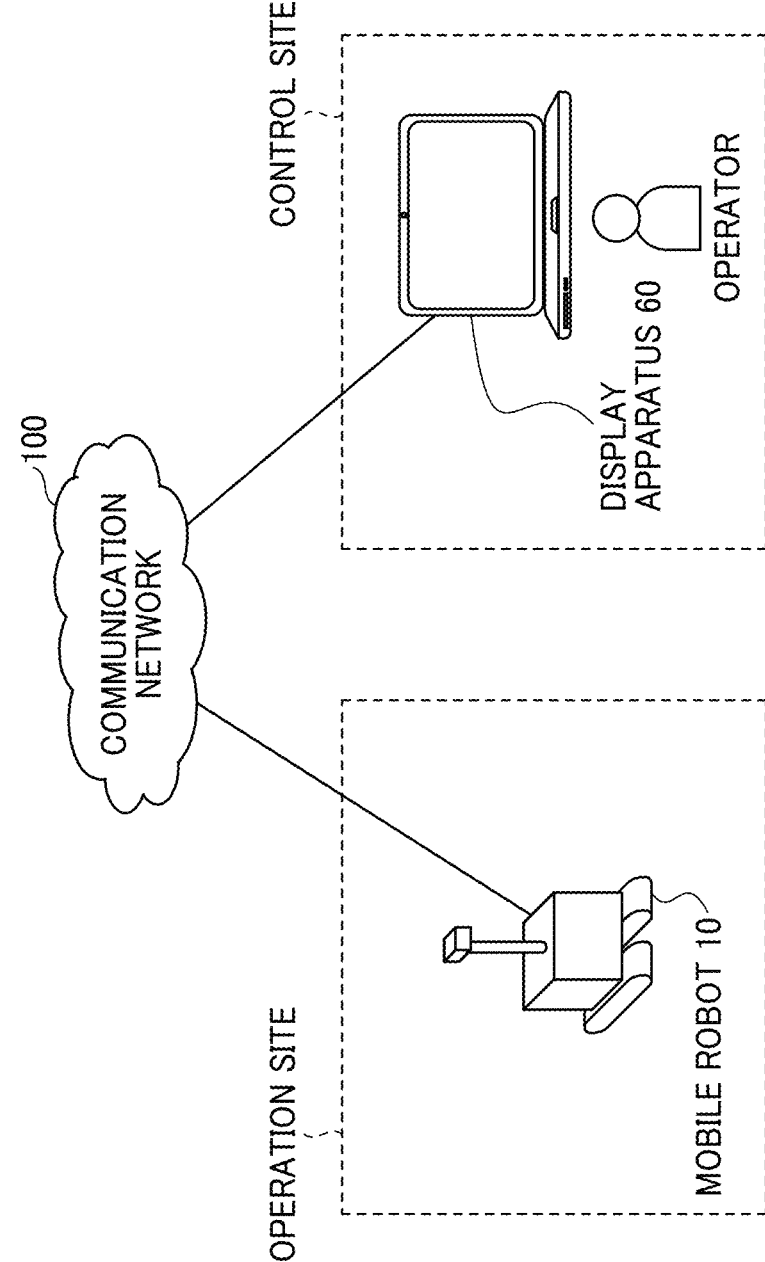
FIG. 3 is a diagram illustrating an example of an overall configuration of a communication system.

FIG. 3 is a diagram illustrating an overall configuration of a communication system 1 according to the present embodiment. The communication system 3 illustrated in FIG. 1 includes a mobile robot 10, which is remotely controlled by an operator to travel in a certain site. The certain site where the mobile robot 10 is located may be referred to as an operation site.

The communication system 1 includes the mobile robot 10 located at the operation site and a display apparatus 60. The mobile robot 10 and the display apparatus 60 of the communication system 1 communicate with one another through a communication network 100. The communication network 100 includes, for example, the Internet, a mobile communication network, a local area network (LAN), or combinations thereof. The communication network 100 may include, in addition to a wired network, a wireless network in compliance with such as 3rd Generation (3G), 4th Generation (4G), 5th Generation (5G), Wireless Fidelity (WI-FI), Worldwide Interoperability for Microwave Access (WiMAX), and Long Term Evolution (LTE).

The mobile robot 10 is a robot installed in the operation site to autonomously travel from one location to another location at the operation site. The autonomous travel includes operation of autonomously travelling the operation site using the result of imitation learning (machine learning) of the routes traveled at the operation site in the past. The autonomous travel may be operation of autonomously travelling the operation site on a travel route set in advance, or operation of autonomously travelling the operation site using a technology such as line tracing. The mode in which the mobile robot 10 travels by autonomous travel may be called an "autonomous travel mode" in the following description. Further, the mobile robot 10 may travel under the manual remote control by an operator at a remote location. The mode in which the mobile robot 10 travels under the remote control by an operator may be called a "manual operation mode" in the following description. In other words, the mobile robot 10 may travel in the operation site while switching between the autonomously travel and the travel under the manual control of the operator. The mobile robot 10 may execute a preset task such as inspection, maintenance, transportation, or light work, while travelling the operation site. In this disclosure, the mobile robot 10 is a robot in a broad sense and may be any robot that can perform both of travel under the remote control by an operator and autonomous travel. Examples of the mobile robot 10 include an automobile that can travel while switching between automatic driving and manual driving according to an operation by an operation at a remote location. Examples of the mobile robot 10 further include flying objects such as a drone, a multicopter, and an unmanned flying object.

The operation site where the mobile robot 10 is installed is, for example, The monitored area is an area (also referred to as a target site, or simply a site) in which the mobile robot 10 is installed. Examples of the monitored area include an outdoor area such as a business place, a factory, a chemical plant, a construction site, a substation, a farm, a field, a cultivated land, or a disaster site; and an indoor area such as an office, a school, a factory, a warehouse, a commercial facility, a hospital, or a nursing facility. In other words, the operation site may be any location where there is a need for the mobile robot 10 to perform tasks that have been manually performed by humans.

The display apparatus 60 may be implemented by a computer such as a laptop personal computer (PC), operated by an operator residing at a control site different from the operation site, to perform predetermined operations to the mobile robot 10.

The operator performs operations, for example, to control the mobile robot 10 to move or execute a predetermined task via an operation screen displayed on the display apparatus 60 at the control site such as an office.

For example, the operator remotely controls the mobile robot 10 while viewing an image of the operation site displayed at the display apparatus 60.

Although one mobile robot 10 and one display apparatus 60 are connected to each other via the communication network 100 in FIG. 3, the display apparatus 60 may be connectable to multiple mobile robots 10 located at one operation site or connectable to multiple mobile robots 10 located at different operation sites. Further, although the display apparatus 60 is located at the remote control site different from the operation site in which the mobile robot 10 is installed in FIG. 3, the display apparatus 60 may be located at the operation site in which the mobile robot 10 is installed. Furthermore, the display apparatus 60 is not limited to a laptop PC and may be, for example, a desktop PC, a tablet communication terminal, a smartphone, or a wearable communication terminal.

Configuration of Mobile Robot

Figures 4A, 4B, 4C:
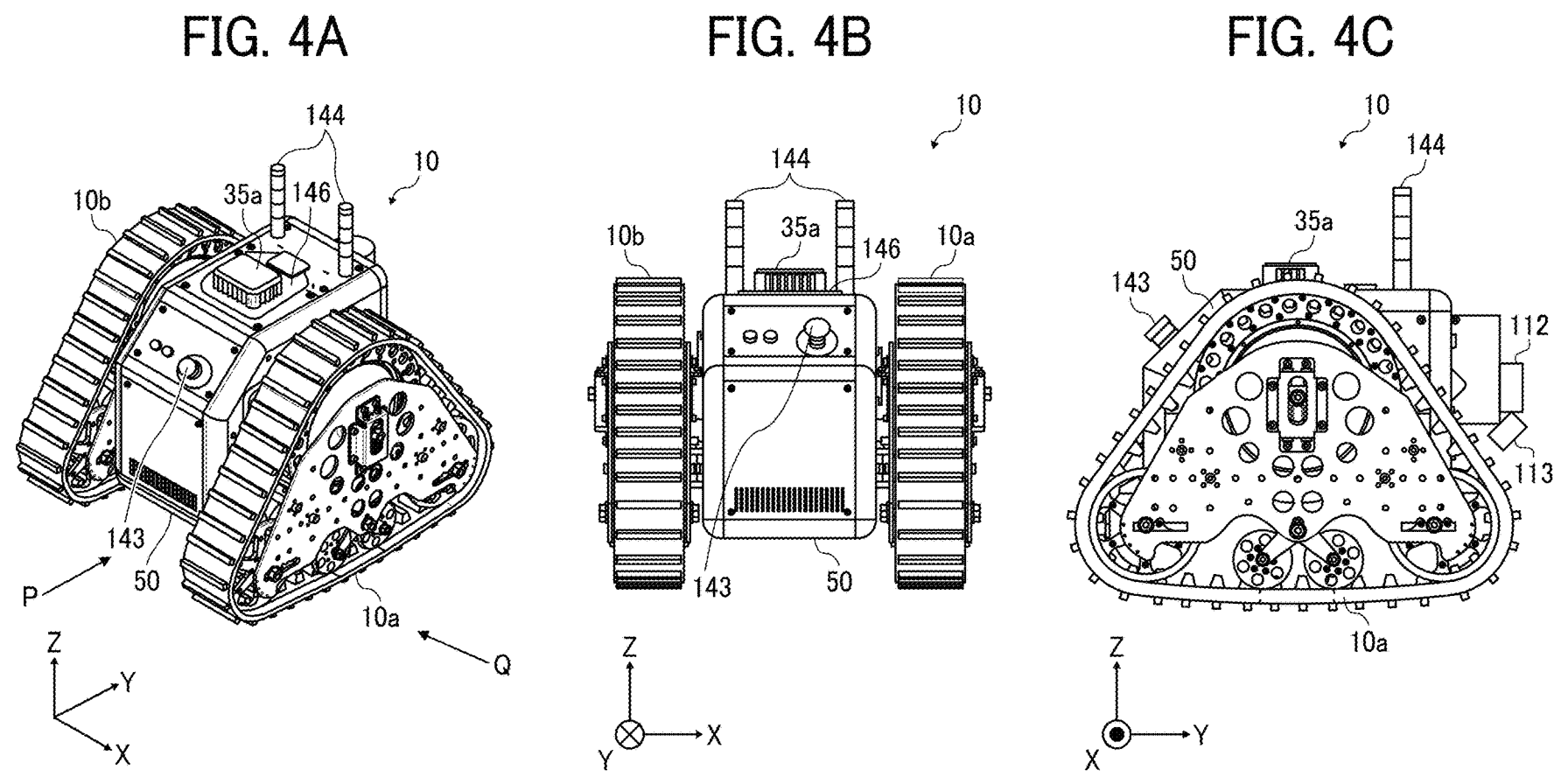

FIG. 4A is a perspective view of an exterior of the mobile robot 10 according to the present embodiment. The mobile robot 10 as a mobile apparatus includes crawler traveling bodies 10a and 10b and a main body 50.

The crawler traveling bodies 10a and 10b are each a unit as traveling means for the mobile robot 10. The crawler traveling bodies 10a and 10b each uses a metallic or rubber belt. Compared with a traveling body that travels with tires, such as an automobile, the crawler traveling body has a wider contact area with the ground, so that the travel is more stable even in an environment with bad footing, for example. While the traveling body that travels with the tires requires space to make a turn, the mobile apparatus with the crawler traveling body can perform a so-called spin turn, so that the mobile apparatus can smoothly turn even in a limited space.

The main body 50 supports the crawler traveling bodies 10a and 10b to travel and contains a controller that controls the driving of the mobile robot 10. The main body 50 further includes a battery to supply electric power for driving the crawler traveling bodies 10a and 10b.

FIG. 4B is a front view of the mobile robot 10 according to the embodiment, as viewed in the direction indicated by arrow P in FIG. 4A. The main body 50 of the mobile robot 10 includes an emergency stop switch 143, state indicator lamps 144, and a lid 146. The emergency stop switch 143 is an operation means to be pressed by a person around the mobile robot 10 to stop the mobile robot 10 that is moving.

The state indicator lamps 144 are each an example of a notification means to indicate the state of the mobile robot 10. When the state of the mobile robot 10 changes, the state indicator lamps 144 light up to notify a person nearby of the state change of the mobile robot 10. The state change is, for example, a decrease in the remaining battery level. The state indicator lamps 144 light up also in response to, for example, the detection of possibility of an abnormality such as the detection of an obstacle that obstructs the traveling of the mobile robot 10. Although the mobile robot 10 in FIG. 4B includes the two state indicator lamps 144, the number of state indicator lamps 144 is not limited thereto and may be one or three or more. In alternative to or in addition to the state indicator lamps 144, the notification means may use, for example, a speaker to output an alert sound indicating a state of the mobile robot 10.

The lid 146 is disposed on an upper face of the main body 50 and seals the inside of the main body 50. The lid 146 has a ventilation part 35*a* having an air vent through which air flows from or into the main body 50.

The two crawler traveling bodies 10*a* and 10*b* are installed such that the mobile robot 10 can travel with the main body 50 interposed therebetween. The number of crawler traveling bodies is not limited to two and may be three or more. For example, the mobile robot 10 may include three crawler traveling bodies arranged in parallel such that the mobile robot 10 can travel. Alternatively, the mobile robot 10 may include, for example, four crawler traveling bodies arranged on the front, rear, right, and left sides like the tires of an automobile.

FIG. 4C is a side view of the mobile robot 10 according to the embodiment, as viewed in the direction indicated by arrow Q in FIG. 4A. The crawler traveling bodies 10*a* and 10*b* each have a triangular shape. The triangular crawler traveling body 10*a* has advantages. For example, when the front-rear length of the traveling body is limited, the triangular shape can maximize the contact area of the traveling body with the ground within the limited length and increase the stability of traveling. By contrast, in the case of a so-called tank crawler in which the upper side (drive wheel side) is longer than the lower side (idler wheel side), when the front-rear direction length is restricted, the contact area with the ground is generally small, leading to unstable traveling. As described above, the crawler traveling body 10*a* is effective in increasing the traveling performance, especially when applied to the mobile robot 10 that is relatively small.

As illustrated in FIG. 4C, the mobile robot 10 includes a range sensor 112 on a front face of the main body 50 in the traveling direction. The range sensor 112 is for horizontal direction detection. The range sensor 112 for horizontal direction detection is a LiDAR sensor and, in the present embodiment, is a micro electro mechanical systems (MEMS) LiDAR sensor for two-dimensional scanning. A LiDAR sensor for three-dimensional scanning may be used.

The range sensor 112 irradiates an object with laser light, measures the time for the laser light to be reflected back from the object, and calculates the distance to the object and the direction in which the object is present based on the measured time.

The mobile robot 10 further includes a range sensor 113 on the front face of the main body 50 in the traveling direction as illustrated in FIG. 4C. The range sensor 113 is for oblique direction detection. The range sensor 113 for oblique direction detection is a LiDAR sensor and, in the present embodiment, is a MEMS LiDAR sensor for two-dimensional scanning. The range sensor 113 is installed at an angle inclined down from the horizontal plane so as to be inclined down at a predetermined inclination angle relative to a horizontal road surface on which the mobile robot 10 travels.

The range sensor 113 irradiates an object (e.g., an obstacle on the road surface) with laser light, measures the time for the laser light to be reflected back from the object, and calculates the distance to the object and the direction in which the object is present based on the measured time.

For the installation position of the range sensor 113, an appropriate value depends on the widths and lengths of the crawlers of the crawler traveling bodies 10*a* and 10*b* and the sizes, widths, depths, and heights of objects to be detected.

The mobile robot 10 illustrated in FIGS. 4A to 4C is a caterpillar traveling robot, but the shape and the traveling method of the mobile robot 10 are not limited to those illustrated in FIG. 2 and may be, for example, a bipedal walking robot, multi-pedal walking robot, a drone, a flying robot, or an underwater moving robot.

Hardware Configuration

Figure 5A:
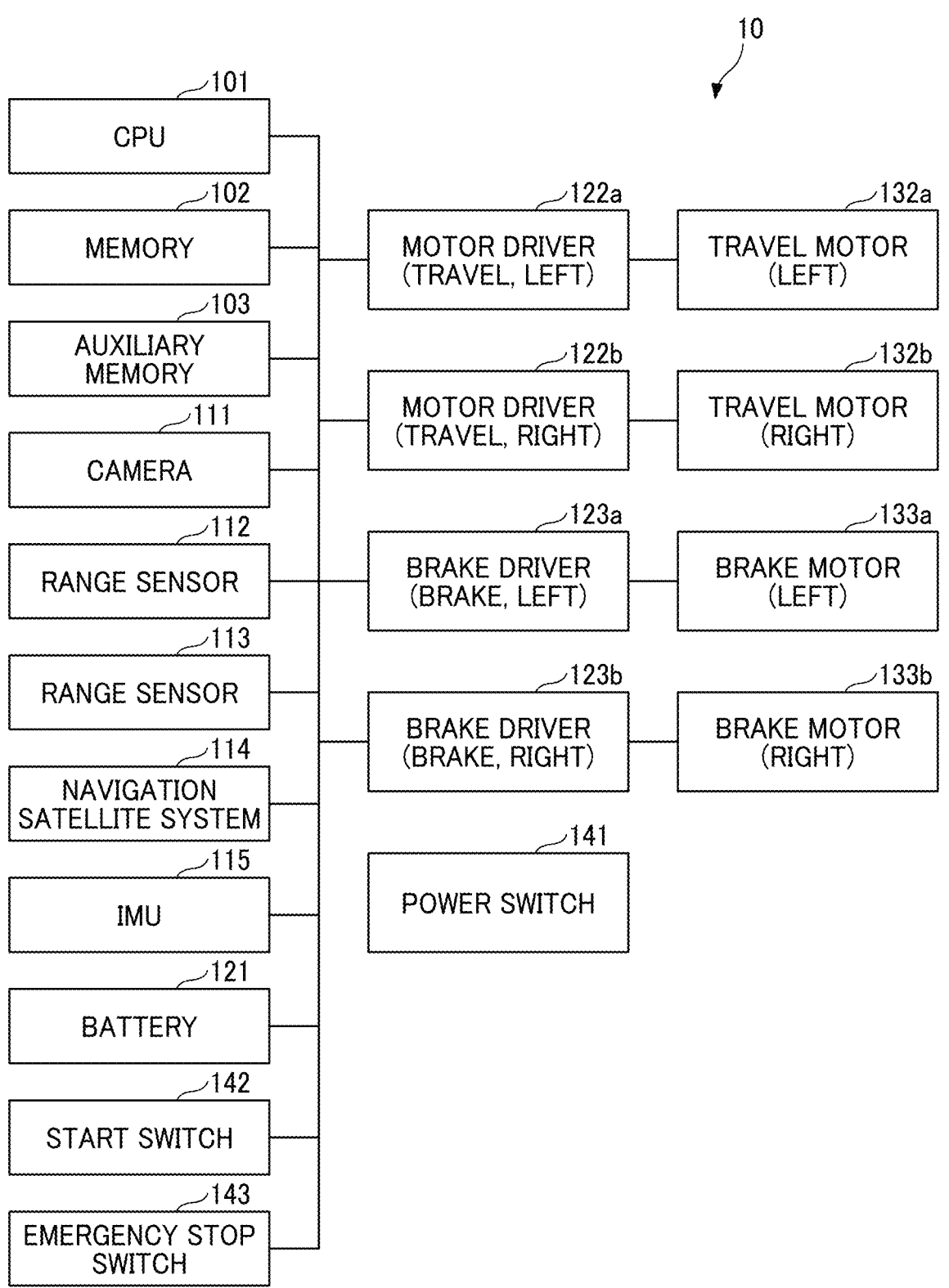
FIG. 5A is a block diagram illustrating an example of a hardware configuration of the mobile robot.
Figure 5B:
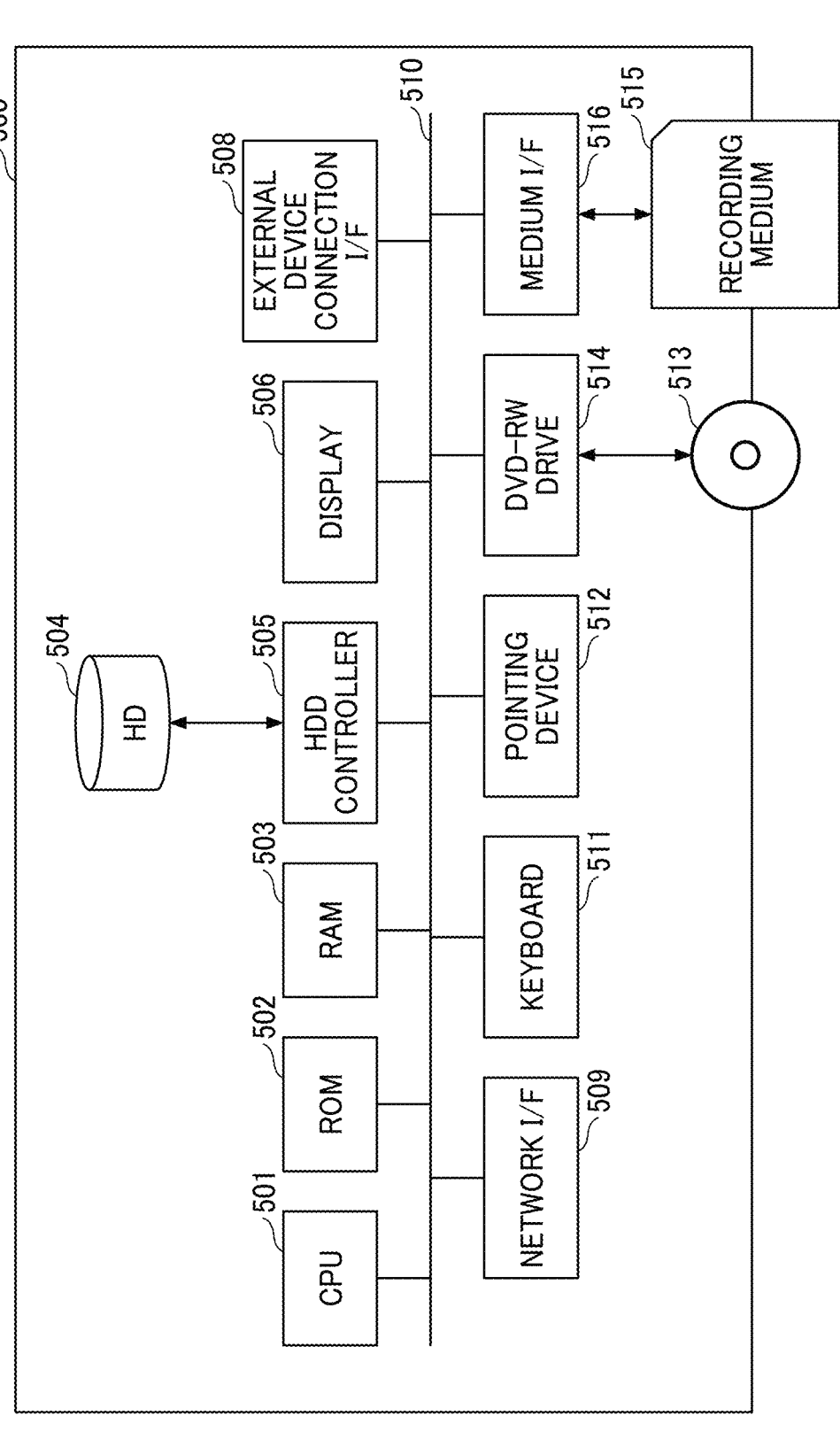
FIG. 5B is a block diagram illustrating an example of a hardware configuration of a display apparatus.

Referring to FIGS. 5A and 5B, a description is given of a hardware configuration of the mobile robot 10 according to the present embodiment. FIG. 5A is a block diagram illustrating the hardware configuration of the mobile robot 10 according to the present embodiment.

As illustrated in FIG. 5A, the mobile robot 10 includes a central processing unit (CPU) 101, a memory 102, an auxiliary memory 103, a camera 111, the range sensor 112 for horizontal detection, the range sensor 113 for oblique detection, a navigation satellite system 114, an inertial measurement unit (IMU) 115, a battery 121, a start switch 142, the emergency stop switch 143, motor drivers 122*a* and 122*b* (left and right), travel motors 132*a* and 132*b* (left and right), brake drivers 123*a* and 123*b* (left and right), brake motors 133*a* and 133*b* (left and right), and a power switch 141.

The CPU 101 controls the entire operation of the mobile robot 10. The memory 102 is a temporary storage area for the CPU 101 to execute programs such as a travel program.

The camera 111 includes a general image-capturing device, such as a digital single-lens reflex camera or a compact digital camera, which acquires planar images. The camera 111 further includes special image-capturing device, such as a spherical camera, a stereo camera, or an infrared camera, which acquires special images. The mobile robot 10 may include multiple cameras 111 and may include both the general image-capturing device to acquire planar images and the special image-capturing device to acquire special images. The range sensor 112 for horizontal direction detection and the range sensor 113 for oblique direction detection are, for example, LiDAR sensors.

The navigation satellite system 114 includes an antenna to receive radio waves from a GNSS satellite and measures the position of the mobile robot 10 on the earth based on the received result. The navigation satellite system 114 is also referred to as a GNSS.

The IMU 115 is an inertial measurement sensor and estimates the position and posture (translational motion and rotational motion in orthogonal triaxial directions) of the mobile robot 10 by an accelerometer and an angular speed sensor. The IMU 115 is an example of an internal sensor.

The battery 121 is a power source for the mobile robot 10 to travel. The start switch 142 is a switch for starting the mobile robot 10. The emergency stop switch 143 is a switch for stopping the mobile robot 10 as desired.

The motor drivers 122*a* and 122*b* are drivers for the travel motors 132*a* and 132*b* included in the two crawler traveling bodies 10*a* and 10*b*, respectively. The brake drivers 123*a* and 123*b* are drivers for the brake motors 133*a* and 133*b* included in the two crawler traveling bodies 10*a* and 10*b*, respectively. The power switch 141 is a switch to turn on or off the power of the mobile robot 10.

The travel program to be executed on the mobile robot 10 in the present embodiment may be recorded, in a file format installable or executable by a computer, on a computer-readable recording medium, such as a compact disc-read only memory (CD-ROM), a flexible disk (FD), a compact disc-recordable (CD-R), or a digital versatile disk (DVD).

The travel program to be executed on the mobile robot 10 according to the present embodiment can be stored on a computer connected to a network, such as the Internet, to be downloaded from the computer via the network. Alternatively, the travel program executed on the mobile robot 10 according to the present embodiment can be provided or distributed via a network such as the Internet. The travel program executed on the mobile robot 10 according to the present embodiment may be prestored in, for example, a ROM.

Display Apparatus

FIG. 5B is a block diagram illustrating a hardware configuration of the display apparatus 60 according to the present embodiment.

As illustrated in FIG. 5B, the display apparatus 60 is implemented by a computer 500 and includes a CPU 501, a ROM 502, a RAM 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc rewritable (DVD-RW) drive 514, and a medium I/F 516.

The CPU 501 controls the entire operation of the computer 500. The ROM 502 stores programs, such as an initial program loader (IPL), for driving the CPU 501. The RAM 503 is used as a work area for the CPU 501. The HD 504 stores various kinds of data such as a program. The HDD controller 505 controls an HDD to read or write various types of data from or to the HD 504 under the control of the CPU 501. The display 506 displays various information such as a cursor, a menu, a window, a character, or an image. The external device connection I/F 508 is an interface for connecting various external devices. Examples of the external device include, but are not limited to, a universal serial bus (USB) memory and a printer.

The network I/F 509 is an interface for performing data communication via a network. The bus line 510 is, for example, an address bus or a data bus for electrically connecting the components such as the CPU 501 illustrated in FIG. 5B to one another.

The keyboard 511 is a kind of input device including multiple keys used for inputting, for example, characters, numerical values, and various instructions. The pointing device 512 is a kind of input device used to, for example, select various instructions, execute various instructions, select a target for processing, and move a cursor. The DVD-RW drive 514 controls the reading or writing of various types of data to or from a DVD-RW 513, which is an example of a removable recording medium. The DVD-RW drive 514 is not limited to the drive for DVD-RW, and may be, for example, a drive for a digital versatile disc-recordable (DVD-R). The medium I/F 516 controls the reading or writing (storing) of data from or to a recording medium 515 such as a flash memory.

Functional Configuration

Referring to FIG. 6 to FIG. 9, a functional configuration of the communication system 1 according to the present embodiment is described below. FIG. 6 is a block diagram illustrating the functional configuration of the communication system 1 according to the present embodiment. FIG. 6 illustrates, of the apparatuses and communication terminals illustrated in FIG. 3, those relating to the processing or operation to be described below.

Functional Configuration of Mobile Robot (Controller)

The mobile robot 10 includes a transmission-reception unit 31, a determination unit 32, an image-capture control unit 33, a state detection unit 34, a location-information acquisition unit 35, a destination-candidate acquisition unit 36, a route-information generation unit 37, a route-information management unit 38, a destination setting unit 39, a travel control unit 40, an image recognition unit 41, a mode setting unit 42, an autonomous travel unit 43, a manual-operation processing unit 44, a task execution unit 45, a map-information generation unit 46 (information generation unit), an image processing unit 47, a learning unit 48, and a storing-reading unit 49. These are units of functions or means implemented or caused to function by one or more of the hardware elements illustrated in FIG. 5A operating in accordance with the instructions of the CPU 101 according to the travel program loaded to the memory 102. The mobile robot 10 further includes a storage unit 3000 implemented by the memory 102 illustrated in FIG. 5A.

The transmission-reception unit 31 has the function of transmitting and receiving various types of data (or information) to and from other apparatus or communication terminal via the communication network 100.

The determination unit 32 is implemented by processing of the CPU 101 and executes various determinations. The image-capture control unit 33 is implemented by processing of the CPU 101 for, for example, the camera 111 and controls imaging processing of the camera 111.

The state detection unit 34 is implemented by the processing of the CPU 101 for, for example, the camera 111 and the range sensors 112 and 113. The state detection unit 34 detects the state of the mobile robot 10 or the surroundings of the mobile robot 10 using various sensors. For example, the state detection unit 34 measures the distance to an object (obstacle) present around the mobile robot 10 and outputs the measured distance as distance data. Further, the state detection unit 34 may use the distance data to acquire data indicating the location of the mobile robot 10 based on a match with an environment map by applying SLAM. SLAM is a technology that allows simultaneous processing of self-localization and environment map generation. The state detection unit 34 further detects the direction to which the mobile robot 10 is heading or faces using, for example, the IMU 115.

The location-information acquisition unit 35 is implemented by the processing of the CPU 101 for the navigation satellite system 114 and acquires location information indicating the current location of the mobile robot 10 using the navigation satellite system 114. For example, the location-information acquisition unit 35 acquires coordinate information indicating the latitude and longitude of the current location of the mobile robot 10 using the navigation satellite system 114.

The destination-candidate acquisition unit 36 is implemented by, for example, the processing of the CPU 101 and acquires an image of a candidate of the destination to which the mobile robot 10 travels (may be referred to as a "destination candidate image" in the following description). Specifically, the destination-candidate acquisition unit 36 acquires, as a destination candidate image, an image captured under the control of the image-capture control unit 33.

For example, the captured image is an image of a partial area of the site where the mobile robot 10 is installed.

The route-information generation unit 37 is implemented by, for example, the processing of the CPU 101 and generates route information indicating a travel route of the mobile robot 10. The route-information generation unit 37 generates route information indicating a route from the current location to the final destination (that is, travel destination) based on the location of the destination candidate selected by the operator of the mobile robot 10. Example methods of generating the route information include a method of connecting the waypoints 8 from the current location to the final destination with a straight line, and a method of minimizing the travel time by avoiding an obstacle using a captured image or information of the obstacle obtained by the state detection unit 34.

The route-information management unit 38 is implemented by, for example, the processing of the CPU 101 and stores the route information generated by the route-information generation unit 37 for management in a route-information management DB 3002.

The destination setting unit 39 is implemented by, for example, the processing of the CPU 101 and sets a travel destination of the mobile robot 10. For example, based on the current location of the mobile robot 10 acquired by the location-information acquisition unit 35 and the route information generated by the route-information generation unit 37, the destination setting unit 39 sets one of destination candidates selected by the operator of the mobile robot 10, as the travel destination to which the mobile robot 10 heads next.

The travel control unit 40 is implemented by, for example, the processing of the CPU 101 for the motor drivers 122a and 122b and controls the travel of the mobile robot 10 by driving the travel motors 132a and 132b. The travel control unit 40 controls the mobile robot 10 to travel, for example, according to a drive instruction from the autonomous travel unit 43 or the manual-operation processing unit 44.

The image recognition unit 41 is implemented by, for example, the processing of the CPU 101 and performs image recognition on a captured image acquired by the image-capture control unit 33. For example, the image recognition unit 41 performs image recognition to determine whether a specific subject is captured in the acquired captured image. The specific subject is, for example, an obstacle on the travel route or around the travel route of the mobile robot 10, an intersection such as a crossroad or an L-shaped road, or a sign or a signal at the site.

The mode setting unit 42 is implemented by, for example, the processing of the CPU 101 and sets an operation mode of the travel of the mobile robot 10. The mode setting unit 42 sets either an autonomous travel mode in which the traveling robot 10 autonomously travels or a manual operation mode in which the mobile robot 10 travels under the control operations manually made by the operator.

The autonomous travel unit 43 is implemented by, for example, the processing of the CPU 101 and controls the autonomous travel of the mobile robot 10. For example, the autonomous travel unit 43 outputs an instruction for driving the mobile robot 10 to the travel control unit 40, such that the mobile robot 10 travels on the travel route indicated by the route information generated by the route-information generation unit 37.

The autonomous travel unit 43 includes a calculation unit 43a, a deviation calculation unit 43b, a position estimation unit 43c, and an integration unit 43d. The calculation unit 43a calculates the position and posture of the mobile robot

10 based on the measurement values of the multiple external sensors and the internal sensors using a known method such as a Kalman filter in the autonomous travel.

The deviation calculation unit 43b calculates the deviation between the local map and the sensor value of the external sensor for each of the multiple external sensors. The position estimation unit 43c determines the calculated deviation as the position and posture of the waypoint 8 as viewed from the mobile robot 10. The integration unit 43d integrates the position and posture of the waypoint 8 determined for each of the multiple external sensors.

The manual-operation processing unit 44 is implemented by, for example, the processing of the CPU 101 and controls the processing instructed by the manual operation for the mobile robot 10. For example, the manual-operation processing unit 44 outputs, to the travel control unit 40, an instruction for driving the mobile robot 10 according to a manual-operation command transmitted from the display apparatus 60.

The task execution unit 45 is implemented by, for example, the processing of the CPU 101 and causes the mobile robot 10 to execute a preset task according to a request from the operator. Examples of the preset task executed by the task execution unit 45 include processing of capturing images for inspection of equipment at the site and performing light work using a movable arm.

The map-information generation unit 46 is implemented by, for example, the processing of the CPU 101 and manages map information representing an environment map of the operation site where the mobile robot 10 is installed, using a map-information management DB 3003. For example, the map-information generation unit 46 generates multiple local maps based on the multiple external sensors, respectively, and manages the local maps in association with the external sensors. The local maps may be stored in association with the external sensors, respectively, in a DB of table format in a memory.

The image processing unit 47 is implemented by, for example, the processing of the CPU 101 and generates a display image (screen image) to be displayed on the display apparatus 60. For example, the image processing unit 47 performs processing on the captured image acquired by the image-capture control unit 33 to generate a display image to be displayed on the display apparatus 60.

The learning unit 48 is implemented by, for example, the processing of the CPU 101 and learns travel routes to be used for autonomous travel of the mobile robot 10. For example, the learning unit 48 performs imitation learning (machine learning) of the travel routes to be used for autonomous travel based on the captured images acquired through the travel operation in the manual operation mode by the manual-operation processing unit 44 and the detection data obtained by the state detection unit 34. The autonomous travel unit 43 causes the mobile robot 10 to autonomously travel based on the learning data, which is the result of imitation learning by the learning unit 48.

The storing-reading unit 49 is implemented by, for example, the processing of the CPU 101 and stores various data or information in the storage unit 3000 or reads various data or information from the storage unit 3000.

Destination-Candidate Management Table

FIG. 7 is a conceptual diagram illustrating a destination-candidate management table according to the present embodiment. The destination-candidate management table is a table for managing one or more candidates of the destination of the mobile robot 10. The storage unit 3000 stores a destination-candidate management DB 3001 in the form of the destination-candidate management table as illustrated in FIG. 7.

The destination-candidate management table stores destination candidate data for each site identifier (ID) for identifying the site where the mobile robot 10 is installed. In the destination candidate data, a candidate ID for identifying a destination candidate, location information indicating the location of the destination candidate, and captured image data obtained by capturing a specific area of the site as the destination candidate are associated with one another. The location information is coordinate information including the latitude and longitude that indicate the location of the destination candidate at the site. In a case where the mobile robot 10 is a flying object such as a drone, the location information includes information such as the speed, the posture or altitude of the flying object in addition to the coordinate information indicating the latitude and longitude. In FIG. 7, the captured image data is illustrated as the electronic file of the image data captured by the mobile robot 10 at the location of the destination candidate at the site. Alternatively, any information for accessing the captured image, such as the name or the storage location of the captured image data file may be used. In this disclosure, the destination candidate is an example of a candidate of a travel destination of the mobile robot 10. The candidate of the travel destination of the mobile robot 10 includes not only a candidate of the destination of the mobile robot 10 but also a candidate of the place to be excluded from the travel route of the mobile robot 10.

Route-Information Management Table

FIG. 8 is a conceptual diagram illustrating a route-information management table according to the present embodiment. The route-information management table is a table for managing route information indicating a travel route of the mobile robot 10. The storage unit 3000 stores a route-information management DB 3002 in the form of the route-information management table as illustrated in FIG. 8.

The route-information management table stores, for each site ID identifying the site where the mobile robot 10 is installed, a route ID for identifying a travel route of the mobile robot 10 and route information indicating the travel route of the mobile robot 10 in association with one another. The route information indicates the travel route of the mobile robot 10 for reaching next destinations one by one in order. The route information is generated by the route-information generation unit 37, for example, when the mobile robot 10 starts the traveling.

In the present embodiment, the travel route connecting the multiple destinations and the travel route stored in the teaching travel are described. However, a part or the whole of the former travel route is the latter travel route, and the two are not strictly distinguished in the description.

Map-Information Management Table

FIG. 9 is a conceptual diagram illustrating a map-information management table according to the present embodiment. The map-information management table is a table for managing a local map generated for each node in the teaching travel. The storage unit 3000 stores a map-information management DB 3003 in the form of the map-information management table as illustrated in FIG. 9.

The map-information management table of FIG. 9 stores a first local map generated by GNSS, having the position and posture of each node as the origin, and a second local map generated by SLAM, having the position and posture of each node as the origin. The first local map and the second local map are generated in suitable data formats, respectively. The "local map" in the present embodiment is "calculation information used for calculating a deviation between a node passed in the teaching travel and a point passed in the autonomous travel." The format of the local map varies depending on the difference in the external sensor. For example, the first local map represents the position and posture in the GNSS coordinate system and is not a typical map. The local maps will be described in detail with reference to FIG. 18.

The map-information management table may further include a local map obtained by a camera. The camera may be a stereo camera or a monocular camera that obtains distance information. The local map by the camera represents information similar to that represented by a local map obtained by SLAM.

Learning-Data Management DB

A description is given below of a learning-data management DB 3004 stored in the storage unit 3000. The learning-data management DB 3004 stores learning data, which is the result of learning by the learning unit 48 of autonomous travel routes of the mobile robot 10. The learning-data management DB 3004 stores, for example, captured image data obtained by the mobile robot 10, various types of detection data, and learning data as the result of imitation learning (machine learning) for each site or for each mobile robot 10. The mobile robot 10 performs autonomous travel based on the learning data stored in the learning-data management DB 3004. The captured image data captured by the special image-capturing device or the general image-capturing device of the camera 111 may include Pan-Tilt-Zoom (PTZ) parameters for specifying an imaging direction of the special image-capturing device or the general image-capturing device. The captured image data including the PTZ parameters is stored (saved) in the storage unit 3000 (in particular, the learning-data management DB 3004) of the mobile robot 10. Alternatively, the mobile robot 10 may store the PTZ parameters in the storage unit 3000 in association with the location information of the destination candidate and further store the coordinate data (x, y, θ) indicating the posture of the mobile robot 10 at the time of acquisition of the captured image data of the destination candidate in the storage unit 3000. This enables the correction of the posture of the mobile robot 10 using the PTZ parameters and the coordinate data (x, y, θ) when the actual location where the mobile robot 10 stops deviates from the location of the destination.

Some data, such as the data of the autonomous travel route (GNSS positioning history) of the mobile robot 10 and the captured image data of destination candidates used for display on the display apparatus 60, may be accumulated on a cloud computing service such as AMAZON WEB SERVICES (AWS).

Functional Configuration of Display Apparatus

Referring back to FIG. 6, a description is given below of a functional configuration of the display apparatus 60. The display apparatus 60 includes a transmission-reception unit 51, an operation reception unit 52, a display control unit 53, a determination unit 54, a manual-operation command generation unit 55, an autonomous-travel request generation unit 56, an image processing unit 57, and a storing-reading unit 59. These units are functions implemented by or means caused to function by one or more of the elements illustrated in FIG. 5B operating according to the instructions from the CPU 501 executing a display apparatus control program loaded to the RAM 503. The display apparatus 60 further includes a storage unit 5000 implemented by the ROM 502, HD 504, or a recording medium 515 illustrated in FIG. 5B.

The transmission-reception unit 51 is implemented by, for example, the processing of the CPU 501 in relation to the network I/F 509 and transmits or receives various types of data or information to or from another device or communication terminal.

The operation reception unit 52 is implemented by, for example, the processing of the CPU 501 in relation to the keyboard 511 or the pointing device 512 and receives various selections or inputs from the operator.

The display control unit 53 is implemented by, for example, the processing of the CPU 501 and controls the display 506 to display various screens. The determination unit 54 is implemented by the processing of the CPU 501 and performs various determinations.

The manual-operation command generation unit 55 is implemented by, for example, the processing of the CPU 501 and generates a manual-operation command (instruction) for moving the mobile robot 10 by a manual operation in response to an input operation performed by the operator. The autonomous-travel request generation unit 56 is implemented by, for example, the processing of the CPU 501 and generates an autonomous-travel request information for causing the mobile robot 10 to autonomously travel. The autonomous-travel request generation unit 56 generates an autonomous-travel request information to the mobile robot 10, for example, based on information on the destination candidate selected by the operator.

The image processing unit 57 is implemented by, for example, the processing of the CPU 501 and generates a display image to be displayed on a display such as the display 506. The image processing unit 57 performs processing, for example, on the captured image acquired by the mobile robot 10 to generate a display image to be displayed on the display apparatus 60. The communication system 1 may be provided with the function of at least one of the image processing unit 47 included in the mobile robot 10 and the image processing unit 57 included in the display apparatus 60.

The storing-reading unit 59 is implemented by, for example, the processing of the CPU 501 and stores various data or information in the storage unit 5000 or reads out various data or information from the storage unit 5000.

Processing or Operation according to Embodiment

Destination-Candidate Registration Process

Figure 10:
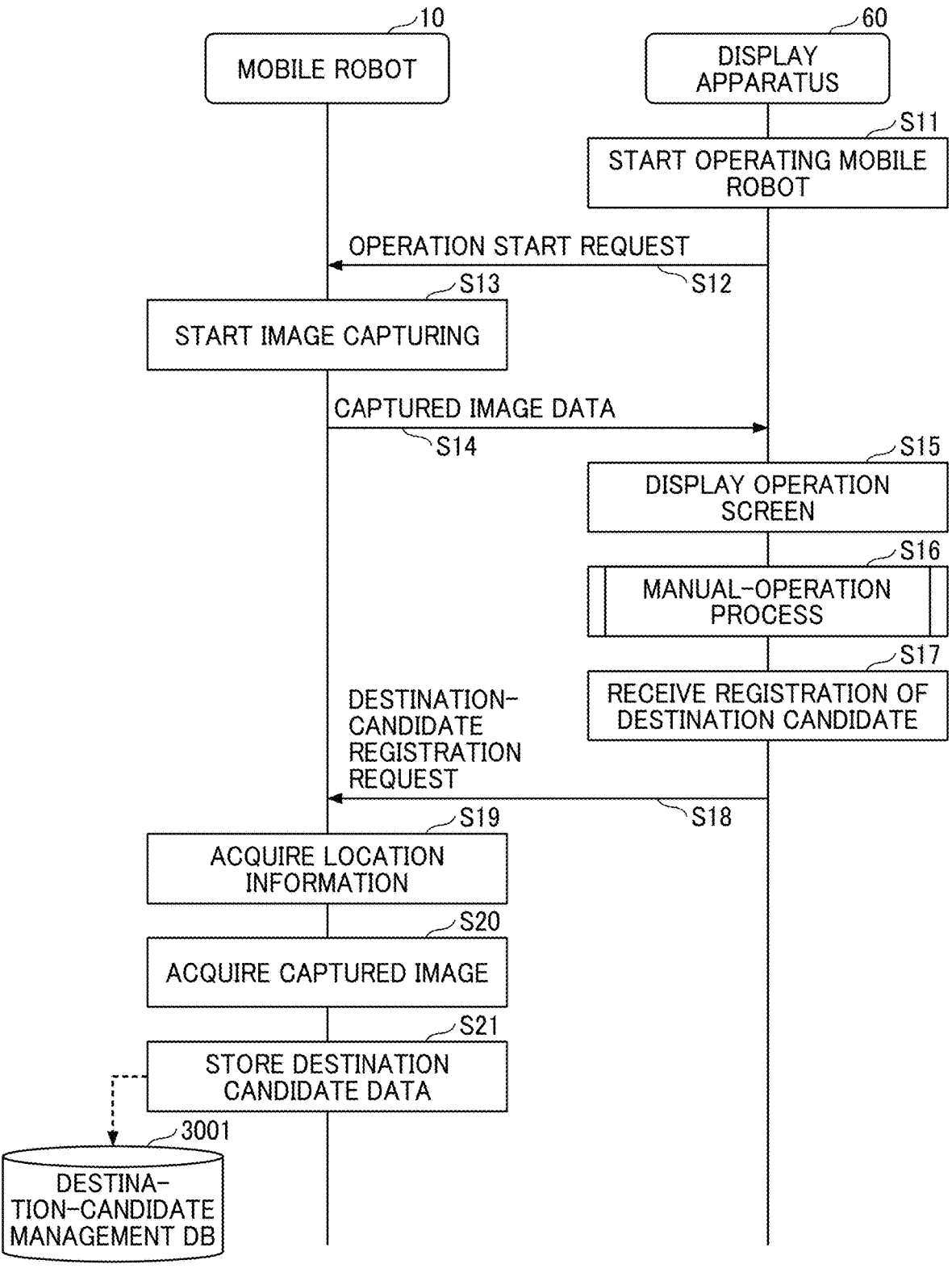
FIG. 10 is a sequence diagram illustrating an example process of registering a destination candidate.

First, referring to FIGS. 10 to 13, a description is given below of a process of registering a destination candidate of the mobile robot 10 according to the present embodiment. FIG. 10 is a sequence diagram illustrating the process of registering a destination candidate according to the present embodiment.

The display apparatus 60 starts operating the mobile robot 10 in response to a predetermined input operation by the operator (S11). The transmission-reception unit 51 transmits an operation start request to the mobile robot 10 (S12).

Accordingly, the transmission-reception unit 31 of the mobile robot 10 receives the operation start request transmitted from the display apparatus 60.

Subsequently, the image-capture control unit 33 starts image capturing using the special image-capturing device and the general image-capturing device of the camera 111 (S13). The image-capture control unit 33 acquires data of captured images captured by the special image-capturing device and the general image-capturing device. In the present embodiment, moving images are acquired by the image capturing in S13. The transmission-reception unit 31 transmits the data of captured images acquired in S13 to the display apparatus 60 (S14). Thus, the transmission-reception unit 51 of the display apparatus 60 receives the captured image data transmitted from the mobile robot 10.

Subsequently, the display control unit 53 of the display apparatus 60 displays an operation screen 200 including the captured image data received in S14 on the display such as the display 506 (S15).

Figure 11:
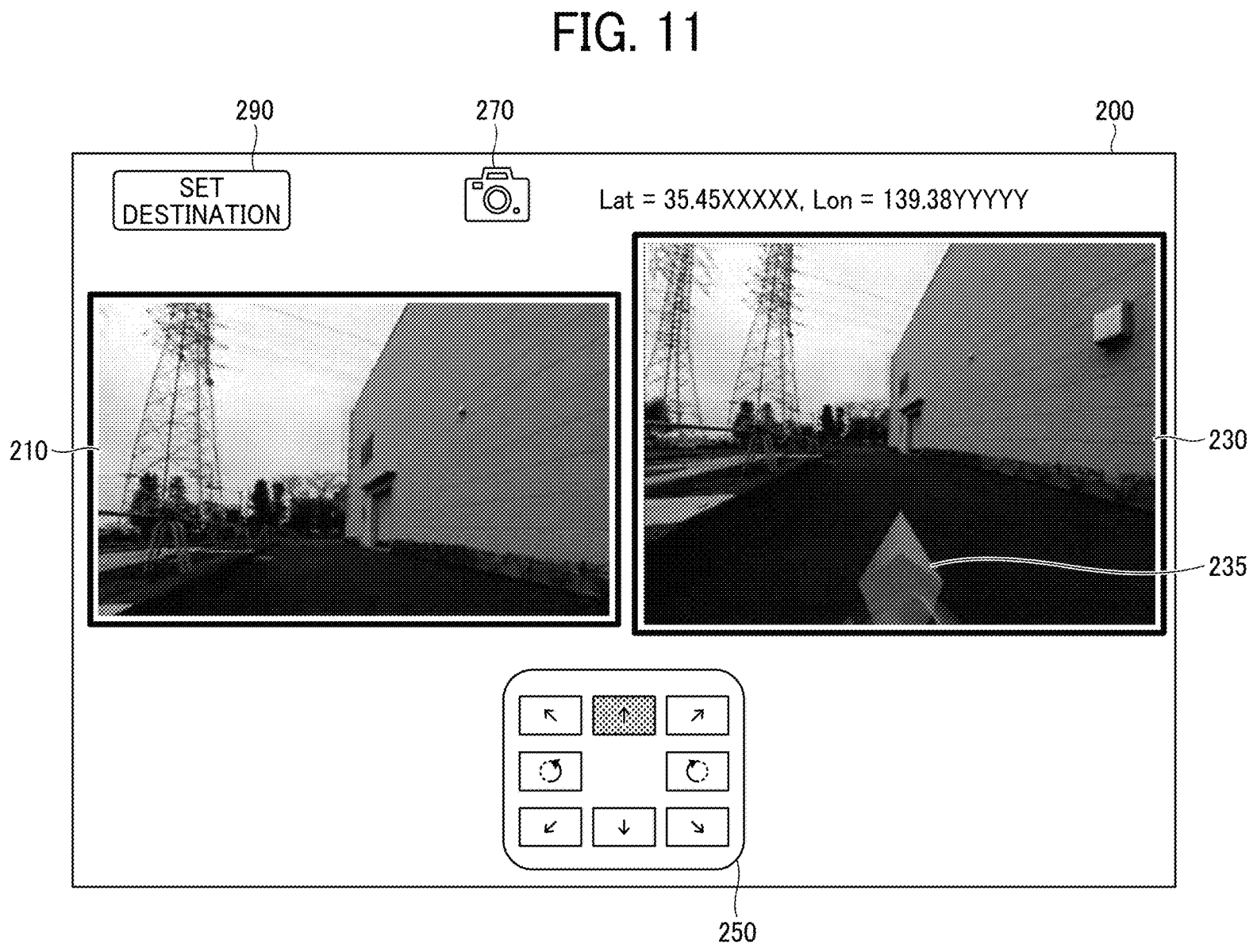

FIG. 11 is an illustration of an operation screen according to the present embodiment. The operation screen 200 illustrated in FIG. 11 is a display screen for the operator to remotely control the mobile robot 10.

The operation screen 200 includes a site display area 210 and a site display area 230. In the site display area 210, captured image data (a planar image) captured by the general image-capturing device of the camera 111 and received in S14 is displayed. In the site display area 230, captured image data (special image) captured by the special image-capturing device of the camera 111 and received in S14 is displayed. The special image displayed in the site display area 230 is an omnidirectional image of the site captured by the special image-capturing device of the camera 111 as described above. Examples of the omnidirectional image include a spherical image, a wide-angle view image, or a hemispherical image. Alternatively, the special image-capturing device may combine the images captured by the general image-capturing device while rotating, so as to obtain an omnidirectional image as the special image. In the site display area 230, further, a mobile robot display image 235 indicating the presence of the mobile robot 10 is superimposed on the special image. In the operation screen 200, further, coordinate information represented by latitude (Lat) and longitude (Lon) is displayed as the location information indicating the current location of the mobile robot 10. In a case where the mobile robot 10 is a flying object such as a drone, the operation screen 200 may display other information such as the speed and the posture (position) or altitude of the flying object, in addition to the coordinate information represented by the latitude and longitude. The operation screen 200 may display the captured images obtained by the special image-capturing device and the general image-capturing device, as live streaming images that are distributed in real time through a computer network such as the Internet.

The operation screen 200 further includes an operation icon 250 for allowing the operator to remotely control the mobile robot 10. The operation icon 250 includes multiple direction instruction buttons each of which is pressed to request movement of the mobile robot 10 in a certain horizontal direction (e.g., forward, backward, right rotation, or left rotation). The operator can remotely control the mobile robot 10 by selecting the direction instruction button on the operation icon 250 while viewing the planar image displayed in the site display area 210 and the special image such as the spherical image displayed in the site display area 230.

In the present embodiment, the travel of the mobile robot 10 is remotely controlled by receiving the selection on the operation icon 250 displayed on the operation screen 200. Alternatively, the travel of the mobile robot 10 may be controlled by a dedicated controller, such as a keyboard or a game pad including a joystick.

The operation screen 200 further includes a destination-candidate registration button 270, which is pressed to register a destination candidate using the planar image displayed in the site display area 210 or the special image displayed in the site display area 230. In the following description, a destination candidate is registered in response to the pressing of the destination-candidate registration button 270 by the operator viewing the special image displayed in the site display area 230. Similar processing is performed also in a case where a destination candidate is registered in response to the pressing of the destination-candidate registration button 270 by the operator viewing the planar image displayed in the site display area 210. The operation screen 200 further includes a destination setting button 290, which is pressed to set a destination of the mobile robot 10.

Subsequently, the display apparatus 60 performs a manual operation processing for the mobile robot 10 using the operation screen 200 displayed in S15 (S16). Details of processing of S16 will be described later.

When the operator presses the destination-candidate registration button 270 on the operation screen 200, the operation reception unit 52 receives a request for registering, as a destination candidate, an area included in the special image displayed in the site display area 230 (S17). Then, the transmission-reception unit 51 transmits a destination-candidate registration request to the mobile robot 10 (S18). The destination candidate registration request is, for example, a request for capturing an image of the area included in the special image displayed in the site display area 230. Accordingly, the transmission-reception unit 31 of the mobile robot 10 receives the destination-candidate registration request transmitted from the display apparatus 60.

Subsequently, the location-information acquisition unit 35 of the mobile robot 10 acquires location information indicating the current location of the mobile robot 10 using the navigation satellite system 114 (S19). Specifically, the location-information acquisition unit 35 acquires coordinate information including the latitude and longitude of the current location of the mobile robot 10. In a case where the mobile robot 10 is a flying object such as a drone, the location-information acquisition unit 35 acquires, as the location information, information such as the speed and the posture or altitude of the flying object in addition to the coordinate information including the latitude and longitude. The destination-candidate acquisition unit 36 acquires a captured image captured by the special image-capturing device at the current location of the mobile robot 10 as a destination candidate image (S20). In the present embodiment, as the destination candidate image, a still image is acquired by the destination-candidate acquisition unit 36.

Then, the storing-reading unit 49 stores the destination candidate data including the location information acquired in S19 and the captured image acquired in S20 in the destination-candidate management DB 3001 (destination-candidate management table) illustrated in FIG. 7 (S21). The storing-reading unit 49 registers, as the destination candidate data, the location information and the captured image each associated with a candidate ID for identifying the destination candidate. The candidate ID may be assigned automatically by the storing-reading unit 49.

As described above, the communication system 1 displays the captured image captured by the mobile robot 10 at the display apparatus 60 operated by the operator who remotely controls the mobile robot 10. This allows the operator to remotely control the mobile robot 10 while visually checking the surroundings of the mobile robot 10 in real time. Further, the communication system 1 registers in advance a captured image obtained by capturing a specific area of the site, as a candidate of the destination for the autonomous travel of the mobile robot 10, in response to an input operation of the operator made in the manual operation for the mobile robot 10.

Manual Operation Process

Figure 12:
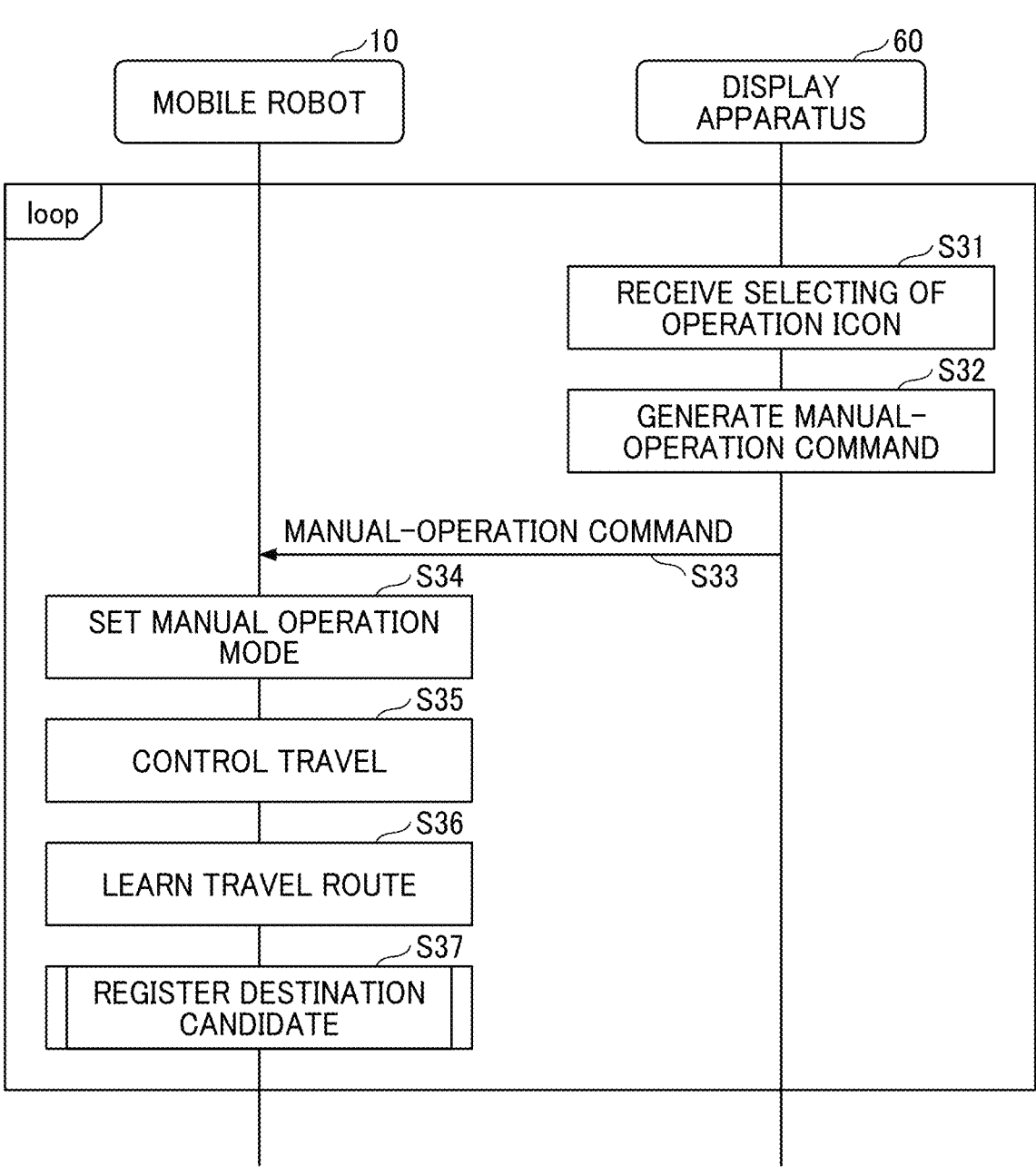
FIG. 12 is a sequence diagram illustrating an example process of a manual operation for the mobile robot.
Figure 13:
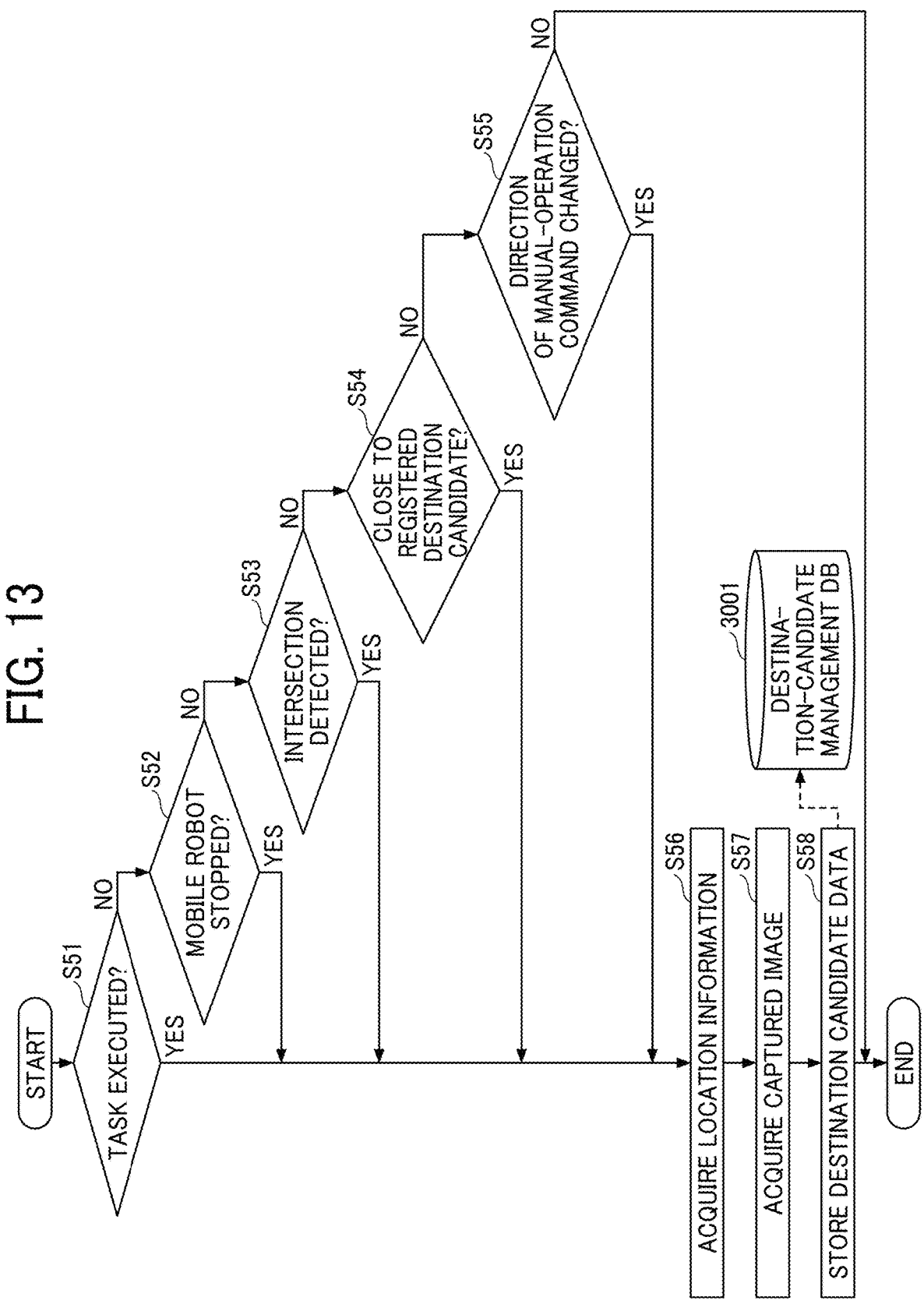
FIG. 13 is a flowchart of an example process of registering a destination candidate according to the travel state of the mobile robot.

Subsequently, referring to FIGS. 12 and 13, a description is given in detail of the manual operation process for the mobile robot 10 in S16 according to the embodiment. FIG. 12 is a sequence diagram of the manual operation process for the mobile robot 10.

First, the operation reception unit 52 of the display apparatus 60 receives selection on the operation icon 250 on the operation screen 200 displayed in S15, according to an input operation of the operator (S31).

The manual-operation command generation unit 55 generates a manual-operation command according to the selection on the operation icon 250 selected in S31 (S32). In the example of FIG. 11, since the operator selects the direction instruction button marked by an up arrow (indicating "forward") on the operation icon 250, the manual-operation command generation unit 55 generates a command for causing the mobile robot 10 to move forward. Then, the transmission-reception unit 51 transmits the manual-operation command generated in S32 to the mobile robot 10 (S33). The transmission-reception unit 31 of the mobile robot 10 receives the manual-operation command transmitted from the display apparatus 60. Regarding the input operation on the operation icon 250 by the operator, in a case where the operator selects the direction instruction button marked by a down arrow indicating "backward" while the mobile robot 10 is moving forward, the displayed captured image may be switched to a rear side image of the mobile robot 10, and the mobile robot 10 may move backward from that point in time. The display apparatus 60 may transmit the manual-operation command to the mobile robot 10, for example, via a managed cloud platform such as AWS IOT CORE.

Subsequently, the mode setting unit 42 sets the mobile robot 10 to operate in the manual operation mode (S34). Then, the manual-operation processing unit 44 outputs an instruction to drive to the travel control unit 40 based on the manual-operation command received in S33. The travel control unit 40 controls the mobile robot 10 to travel according to the drive instruction from the manual-operation processing unit 44 (S35). Further, the learning unit 48 performs imitation learning (machine learning) of the travel routes traveled by the processing of the manual-operation processing unit 44, according to the manual operation (S36). The learning unit 48 performs imitation learning of the travel routes, for example, based on the captured images acquired through the travel operation in the manual operation mode by the manual-operation processing unit 44 and the detection data obtained by the state detection unit 34. The learning unit 48 may perform imitation learning of travel routes using only the captured images acquired in manual operation. Alternatively, the learning unit 48 may perform imitation learning of travel routes using both the captured images and the detection data obtained by the state detection unit 34. The captured images used for the imitation learning by the learning unit 48 may be the captured images acquired by the autonomous travel unit 43 during the autonomous travel in the autonomous travel mode.

Subsequently, the mode setting unit 42 of the mobile robot 10 sets the mobile robot 10 to operate in the manual operation mode (S34). Then, the manual-operation processing unit 44 outputs an instruction to drive to the travel control unit 40 based on the manual-operation command received in S33. The travel control unit 40 controls the mobile robot 10 to travel according to the drive instruction from the manual-operation processing unit 44 (S35). Further, the learning unit 48 performs imitation learning (machine learning) of the travel routes traveled by the processing of the manual-operation processing unit 44, according to the manual operation (S36). The learning unit 48 performs imitation learning of the travel routes, for example, based on the captured images acquired through the travel operation in the manual operation mode by the manual-operation processing unit 44 and the detection data obtained by the state detection unit 34. The content of learning of travel routes includes the position and posture of the mobile robot 10.

Then, the mobile robot 10 executes registration of destination candidate in the travel operation (S37). FIG. 13 is a flowchart of a process of registering a destination candidate according to the trave state of the mobile apparatus.

First, the determination unit 32 determines whether a preset task has been executed by the task execution unit 45 (S51). Specifically, the task execution unit 45 causes the mobile robot 10 to execute a preset task according to, for example, a task execution request from the operator or a schedule set in advance. Then, the determination unit 32 determines whether the preset task is executable under the control of the task execution unit 45. Examples of the preset task include capturing images for inspection of equipment at the site and performing light work using the movable arm.

The mobile robot 10 performs inspection work of an inspected object such as a meter or a valve, for example, when entering an inspection area while traveling the site. At this time, the mobile robot 10 stops traveling to perform the operation to capture an image of the inspected object. Such operation may be used to trigger the registration of the destination candidate.

When determining that the preset task has been executed by the task execution unit 45 (YES in S51), the determination unit 32 proceeds the process to S56. By contrast, when determining that the preset task is not executed by the task execution unit 45 (NO in S51), the determination unit 32 proceeds the process to S52.

Subsequently, the determination unit 32 determines whether the mobile robot 10 has stopped moving (S52). Specifically, when determining that the drive control of the travel motors 132a and 132b by the travel control unit 40 is stopped, the determination unit 32 determines that the mobile robot 10 stops moving. When the determination unit 32 determines that the mobile robot 10 has stopped moving (YES in S52), the determination unit 32 proceeds the process to S56. By contrast, when the determination unit 32 determines that the mobile robot 10 has not stopped moving (i.e., the mobile robot 10 is moving) (NO in S52), the determination unit 32 proceeds the process to S53.

The determination unit 32 then determines whether an intersection is detected near the mobile robot 10 (S53). Specifically, the image recognition unit 41 performs image recognition on a captured image acquired by the special image-capturing device or the general image-capturing device. Then, the determination unit 32 determines whether an intersection has been detected in the captured image as a result of the processing of the image recognition unit 41. The mobile robot 10 can acquire an image as viewed from different directions on the travel route at a time regardless of the travel direction, by acquiring a special image captured omnidirectionally at a distinctive location such as an intersection. The intersection is an example of a specific subject detected by the image recognition unit 41. The specific subject is not limited to an intersection but may be, for example, an obstacle on or around the travel route of the mobile robot 10, or a sign or a signal at the operation site. The specific subject differs depending on the type of the mobile robot 10, such that the specific subject differs between the case where the mobile robot 10 travels on a road surface and the case where the mobile robot 10 flies like a drone. The mobile robot 10 is preliminarily set with information on the specific subject to be detected.

When determining that an intersection has been detected near the mobile robot 10 (YES in S53), the determination unit 32 proceeds the process to S56. By contrast, when determining that an intersection has not been detected near the mobile robot 10 (NO in S52), the determination unit 32 proceeds the process to S54.

Subsequently, the determination unit 32 determines whether the current location of the mobile robot 10 is close to the destination candidate registered in the destination-candidate management DB 3001 (S54). Specifically, the determination unit 32 refers to the location information of the destination candidates stored in the destination-candidate management DB 3001 and determines whether there is a destination candidate close to the current location of the mobile robot 10 acquired by the location-information acquisition unit 35. The determination of whether the current location is close to the destination candidate is made based on, for example, the difference in value between the location information of the destination candidate preliminarily set and the location information indicating the current location of the mobile robot 10. Alternatively, the determination of whether the current location is close to the destination candidate may be made by performing image recognition on a captured image of the destination candidate (destination candidate image) and a captured image at the current location of the mobile robot 10.

When determining that the current location of the mobile robot 10 is close to the destination candidate registered in the destination-candidate management DB 3001 (YES in S54), the determination unit 32 proceeds the process to S56. By contrast, when determining that the current location of the mobile robot 10 is not close to the destination candidate registered in the destination-candidate management DB 3001 (NO in S54), the determination unit 32 proceeds the process to S55.

Subsequently, the determination unit 32 determines whether the direction instructed by the manual-operation command transmitted from the display apparatus 60 has been changed (S55). Specifically, the determination unit 32 determines whether the travel direction instructed by the manual-operation command has been changed, based on the manual-operation command received in S33. For example, when the manual-operation command instructs a characteristic operation, the determination unit 32 determines that the travel direction has been changed. Examples of the characteristic operation include steering by a certain amount or more, accelerating, and braking, which are performed, for example, when the mobile robot 10 travels through an intersection or a curve.

When it is determined that the travel direction instructed by the manual-operation command transmitted from the display apparatus 60 has been changed (YES in S55), the determination unit 32 proceeds the process to S56. By contrast, when the determination unit 32 determines that the travel direction instructed by the manual-operation command transmitted from the display apparatus 60 is not changed (NO in S55), the determination unit 32 ends the process.

In S56, the location-information acquisition unit 35 acquires the location information indicating the current location of the mobile robot 10 using, for example, the navigation satellite system 114. In addition, the destination-candidate acquisition unit 36 acquires a captured image captured by the special image-capturing device at the current location of the mobile robot 10 as a destination candidate image indicating a destination candidate of the mobile robot 10 (S57).

Then, the storing-reading unit 49 stores the destination candidate data including the location information acquired in S19 in FIG. 10 and the captured image acquired in S20 in FIG. 10 in the destination-candidate management DB 3001 (destination-candidate management table) illustrated in FIG. 7 (S58). The storing-reading unit 49 registers, as the destination candidate data, the location information and the captured image each associated with a candidate ID for identifying the destination candidate. The candidate ID may be assigned automatically by the storing-reading unit 49.

As described above, the mobile robot 10 automatically captures an image of the surroundings of the mobile robot 10 using the camera 111 mounted on the mobile robot 10, based on a predetermined determination criterion in accordance with the travel state of the mobile robot 10, and registers in advance the captured image indicating a candidate of the travel destination of the mobile robot 10. The determination criterion by the determination unit 32 is not limited to the those described above referring to S51 to S55 but is appropriately set in accordance with details of the manual operation of the mobile robot 10 and the surroundings of the mobile robot 10.

The determination criterion by the determination unit 32 may be, for example, a state change of the mobile robot 10 to be recognized by the operator when the operator selects the destination of the mobile robot 10, the condition of the operation site, or an environmental change at the operation site.

Destination Setting

Figure 14:
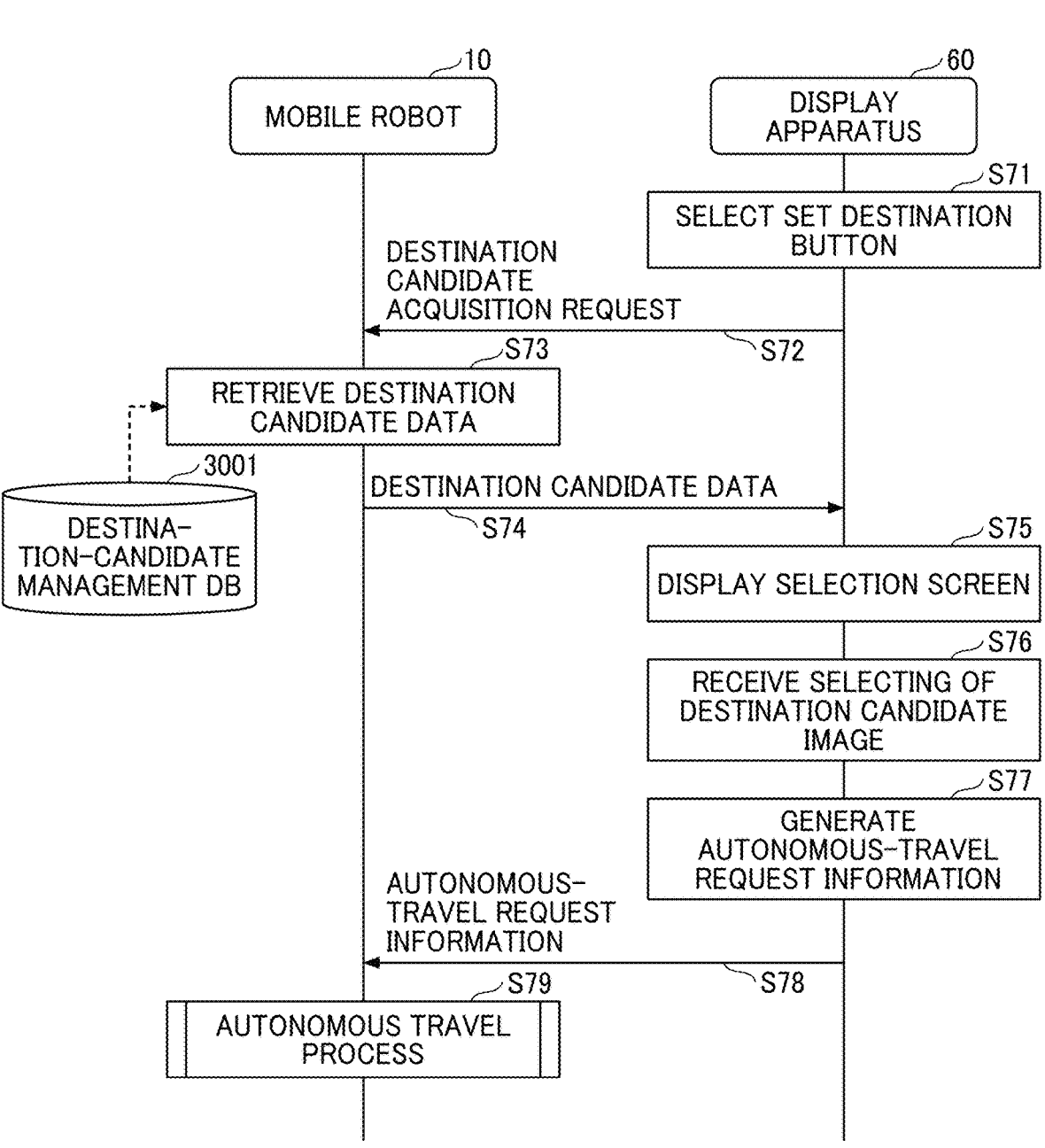
FIG. 14 is a sequence diagram illustrating an example process of setting a destination of the mobile robot.

Subsequently, referring to FIGS. 14 to 17, a description is given of setting the destination of the mobile robot 10 using the destination candidates registered through the above-described process. FIG. 14 is a sequence diagram illustrating a process of setting the destination of the mobile robot 10 according to the present embodiment.

First, the operation reception unit 52 of the display apparatus 60 receives selection of the destination setting button 290 by an input operation of the operator on the operation screen 200 (S71).

Subsequently, the transmission-reception unit 51 transmits a destination candidate acquisition request for requesting data indicating the destination candidate, to the mobile robot 10 (S72). The destination candidate acquisition request includes the site ID for identifying the site where the mobile robot 10 is installed. The transmission-reception unit 31 of the mobile robot 10 receives the destination candidate acquisition request transmitted from the display apparatus 60.

Subsequently, the storing-reading unit 49 searches the destination-candidate management DB 3001 (destination-candidate management table) illustrated in FIG. 7 using the site ID indicated by the destination candidate acquisition request received in S72, as a search key, to retrieve the destination candidate data associated with the same site ID as the received site ID (S73).

Then, the transmission-reception unit 31 transmits the destination candidate data retrieved in S73 to the display apparatus 60 that is the source of the request (S74). The destination candidate data retrieved in S73 includes, for each of multiple destination candidates, the candidate ID, the captured image, and the location information. Thus, the transmission-reception unit 51 of the display apparatus 60 receives and acquires the destination candidate data transmitted from the mobile robot 10.

Subsequently, the display control unit 53 of the display apparatus 60 displays a selection screen 400 including the destination candidate data received in S74 on the display such as the display 506 (S75). Specifically, the image processing unit 57 generates the selection screen 400 based on the received destination candidate data. Then, the display control unit 53 displays the selection screen 400 generated by the image processing unit 57. Alternatively, the image processing unit 47 of the mobile robot 10 may generate the selection screen 400. In this case, the image processing unit 47 generates the selection screen 400 based on the destination candidate data retrieved in S73. In S74, the transmission-reception unit 31 transmits screen data of the selection screen 400 including the destination candidate data generated by the image processing unit 47 to the display apparatus 60.

Figure 15:
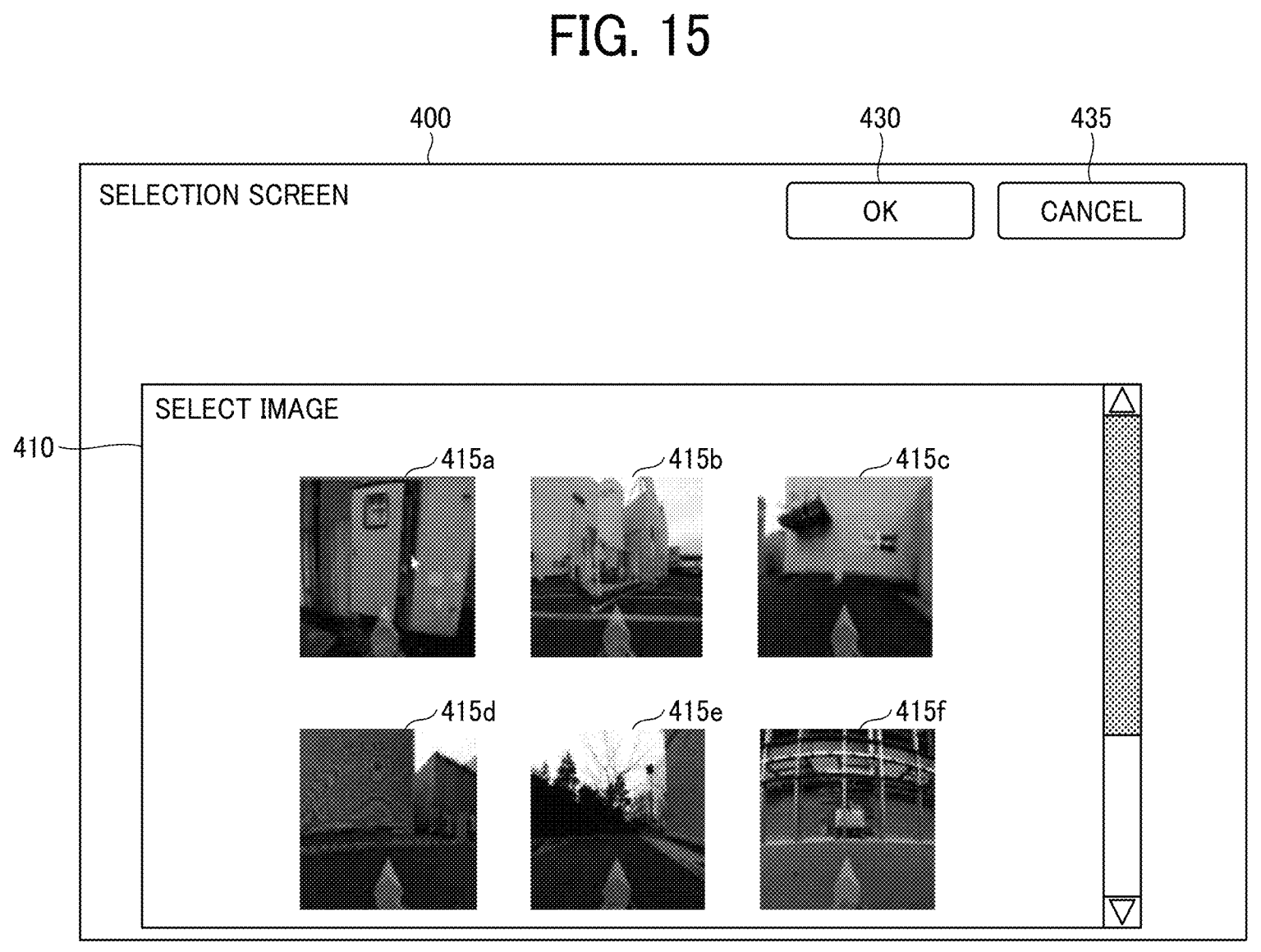
Figure 16:
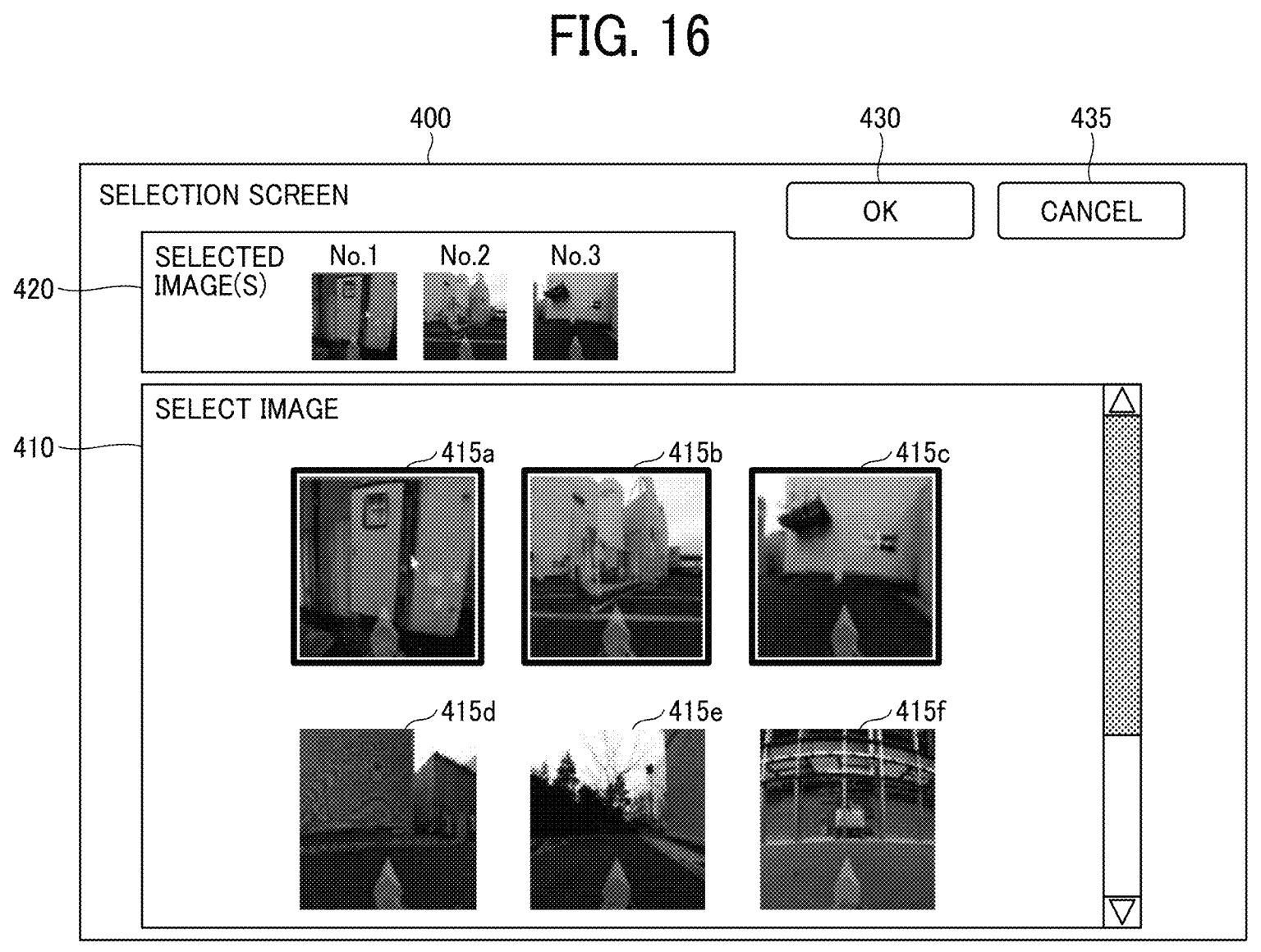

FIGS. 15 and 16 illustrate examples of the selection screen. The selection screens 400 illustrated in FIGS. 15 and 16 are each a display screen that allows the operator to select the destination to which the mobile robot 10 travels.

The selection screen 400 includes an image display area 410, which displays multiple captured images 415a to 417f (may be collectively referred to as the captured images 415) selectably by the operator. The captured images 415a to 417f are the destination candidate images included in the destination candidate data received in S74. The selection screen 400 further includes an OK button 430 to be pressed to complete the selection and a cancel button 435 to be pressed to cancel the selection.

The operator selects one or more captured images 415 displayed in the image display area 410 using an input means such as the pointing device 512.

When the operator selects some of the captured images 415 displayed in the image display area 410, the operation reception unit 52 of the display apparatus 60 receives the selection of destination candidate image, which indicates an area to be set as the destination (S76). In the selection screen 400 illustrated in FIG. 16, for example, the captured images 415a, 415b, and 415c are selected by the operator. When some of the captured images 415 displayed in the image display area 410 are selected, the selected captured images are displayed in a selection result display area 420 on the selection screen 400 as illustrated in FIG. 16. The selection result display area 420 displays the selected captured images in the order selected by the operator (No.1 to No.3). The operator selects, as the travel destination of the mobile robot 10, for example, a captured image including an area where the mobile robot 10 is to execute a task, or a captured image including an area of a branch, such as an intersection, on the travel route at the site in a case where the mobile robot 10 travels to the location where the task is executed.

As described above, the display apparatus 60 selects an area indicated by the captured image 415 as the travel destination of the mobile robot 10 using the captured image 415 (destination candidate image) indicating a travel destination candidate of the mobile robot 10, which has been captured in advance by the mobile robot 10. This increases the operability in selecting the travel destination of the mobile robot 10, for example, as compared to the method of allowing the operator to input a character string indicating location information or a keyword.

Subsequently, when the selection of the destination candidate image is received in S76 and the operator presses the OK button 430, the autonomous-travel request generation unit 56 of the display apparatus 60 generates autonomous-travel request information (S77). The autonomous-travel request information includes one or more candidate IDs respectively associated with one or more captured images 415 having been selected in S76 and information indicating the order in which the selection of the captured images is received in S76.

Subsequently, the transmission-reception unit 51 transmits the autonomous-travel request information generated in S77 to the mobile robot 10 (S78). The transmission-reception unit 31 of the mobile robot 10 receives the autonomous-travel request information transmitted from the display apparatus 60.

Then, the mobile robot 10 starts autonomous travel based on the autonomous-travel request information received in S78 (S79).

Autonomous Travel

Figure 17:
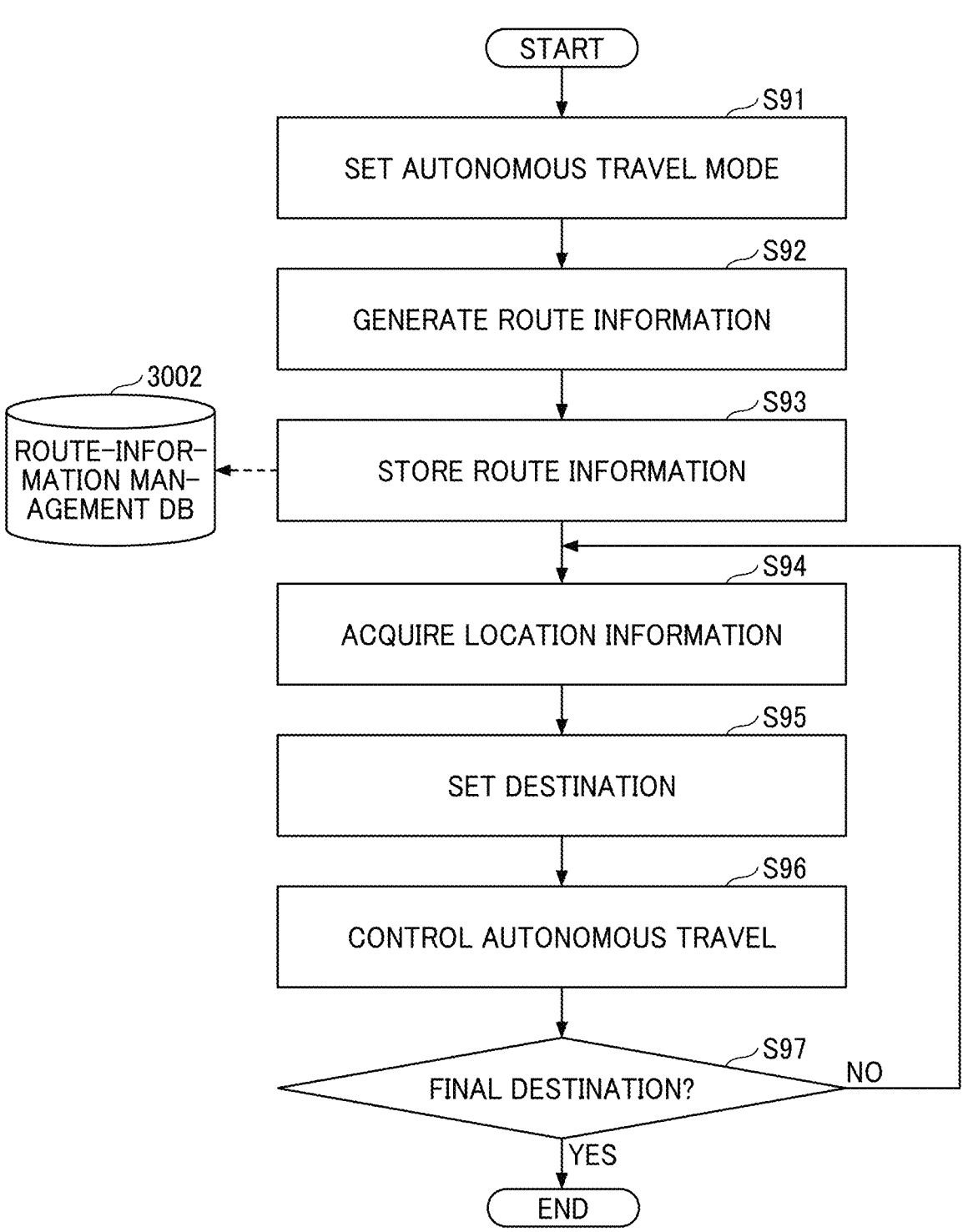
FIG.17 is a flowchart of an example process of autonomous travel performed by the mobile robot.

Subsequently, referring to FIGS. 17 to 18, a description is given in detail of the autonomous travel of the mobile robot 10, performed in S79. FIG. 17 is a flowchart illustrating an autonomous travel process performed by the mobile robot 10 according to the present embodiment.

First, when the autonomous-travel request information is received in S78, the mode setting unit 42 of the mobile robot 10 sets the mobile robot 10 to operate in the autonomous travel mode (S91).

Subsequently, the route-information generation unit 37 generates route information indicating an autonomous travel route of the mobile robot 10 based on the autonomous-travel request information received in S78 (S92). Specifically, based on the candidate IDs and the order of selecting the captured images 415 specified by the candidate IDs, which are indicated by the received autonomous-travel request information, the route-information generation unit 37 generates a travel route such that the mobile robot 10 autonomously travels the areas indicated by the captured images 415, in the order in which the captured images 415 are selected by the operator. The travel route generated by the route-information generation unit 37 is not limited to the route in the order of selecting of the captured images 415. Alternatively, the route-information generation unit 37 may generate route information based on locations where the captured images 415 are captured, which are stored in the destination-candidate management DB 3001, such that the distance or travel time of the travel route connecting the locations indicated by the selected captured images 415 becomes shorter.

Then, the route-information management unit 38 stores the route information generated in S92 in the route-information management DB 3002 (route-information management table) illustrated in FIG. 8 in association with the site ID received in S72 (S93).

Subsequently, the location-information acquisition unit 35 acquires location information indicating the current location of the mobile robot 10 (S94).

The destination setting unit 39 sets the travel destination of the mobile robot 10 based on the current location of the mobile robot 10 acquired by the location-information acquisition unit 35 and the route information generated in S92 (S95). Specifically, the destination setting unit 39 sets, as the travel destination, for example, the location of a destination to which the mobile robot 10 should go next, from among multiple destinations each specified by the candidate ID in the generated route information. For example, in a case where autonomous travel just starts, the destination setting unit 39 sets, as the travel destination, the location of the destination specified by the first candidate ID in the route information. Then, the destination setting unit 39 generates a travel route from the acquired current location of the mobile robot 10 to the travel destination that is thus set. Example methods for the destination setting unit 39 to generate the travel route include a method of connecting the current location and the destination with a straight line, and a method of minimizing the travel time by avoiding an obstacle using a captured image or information of the obstacle obtained by the state detection unit 34.

The method for the destination setting unit 39 to generate the travel route is not limited to generating the travel route using the location information of travel destination candidates registered in the destination-candidate management DB 3001. Alternatively, the following method may be adopted. Based on the result of image recognition by the image processing unit 47 on the captured image captured by the camera 111, the destination setting unit 39 may identify a location in the captured image 415 set as the travel destination.

Then, the travel control unit 40 controls the mobile robot 10 to travel to the set travel destination through the travel route generated in S92. In this case, the travel control unit 40 controls the mobile robot 10 to autonomously travel according to a drive command from the autonomous travel unit 43 (step S96). The autonomous travel process performed by the autonomous travel unit 43 will be described in detail later.

When the mobile robot 10 has reached the final destination (YES in S97), the travel control unit 40 ends the process. By contrast, when the mobile robot 10 has not reached the final destination (NO in S97), the travel control unit 40 repeats the process from S94 and continues the autonomous travel until the mobile robot 10 reaches the final destination.

In this manner, the mobile robot 10 autonomously travels to the location indicated in the captured image 415 selected by the operator as the destination of the mobile robot 10. In the autonomous travel mode, the mobile robot 10 autonomously travels according to the generated route information or using the learning data learned in the manual operation mode.

Integration of Deviation from Travel Route using
Local Map

A description is given below of a process of calculating a deviation from the travel route by comparing the multiple local maps associated with the way points 8 with the sensor values of the multiple external sensors in the teaching travel and integrating the deviations for the external sensors. First, a topological map will be described.

Figure 18:
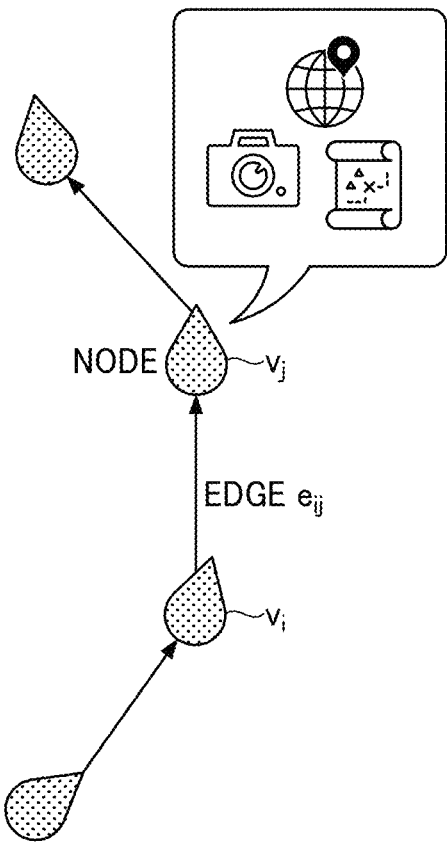
FIG. 18 is a conceptual diagram of a topological map.

FIG. 18 is a conceptual diagram of a topological map. In the present embodiment, as described above, the mobile robot 10 includes N external sensors and one or more internal sensors, and calculates the relative travel amount (odometry) of the mobile robot 10. The external sensors are, for example, the navigation satellite system (GNSS) 114, the range sensors (LiDARs) 112 and 113, and the camera 111 (examples of a first external sensor and a second external sensor). The internal sensor is, for example, the IMU 115. The mobile robot 10 may further includes an encoder as another internal sensor. The mobile robot 10 is a teaching repetitive type autonomous mobile system using a map in the form of a topological map. A topological map is a graphic map using a node set V and an edge set E. An element $e_{ij}$ of the edge set E is defined between two nodes $v_i$ and $v_j$ and has a relative position (an example of relative position information) between $v_i$ and $v_j$.

The map-information generation unit 46 stores a local map (calculation information) generated using the sensor values of the external sensors and the internal sensors for the node $v_i$, which is an element of the node set V. In the present embodiment, "information that enables calculation of a deviation (position and posture) between a point passed in the teaching travel and a point passed in autonomous travel" is referred to as a "map." For example, it is assumed that a two-dimensional grid map (an H×W image in which 1 is stored in a grid in which an obstacle is present and 0 is stored in a grid in which no obstacle is present) generated by the LiDAR during the teaching travel and a scanning point cloud of the LiDAR in the autonomous travel are given. In this case, the position and posture of the origin (=a point passed in the teaching travel=a node) of the two-dimensional grid map viewed from the mobile robot 10 in the autonomous travel can be calculated by, for example, optimization calculation. Accordingly, when the external sensor called LiDAR is used, the two-dimensional grid map can be called a "map." By contrast, it is assumed that the position (latitude and longitude) and the azimuth observed by the GNSS in the teaching travel and the position (latitude and longitude) and the azimuth observed by the GNSS in the autonomous travel are given. In this case, since the position and posture of the point (node) passed in the teaching travel, viewed from the mobile robot 10 can be calculated, the "position (latitude and longitude) and the azimuth observed by the GNSS in the teaching travel" is also called a "map" in the present embodiment.

The autonomous travel of the mobile robot 10 includes two phases, a "route teaching phase" and an "autonomous travel phase." The "route teaching phase" corresponds to the teaching travel. In this phase, the operator manually operates the mobile robot 10 with the controller to travel on a travel route on which the mobile robot 10 is expected to autonomously travel. The "autonomous travel phase" corresponds to autonomous travel. In this phase, the mobile robot 10 autonomously travels so as to trace the travel route (move on or along the travel route) traveled in the "route teaching phase."

Figure 19:
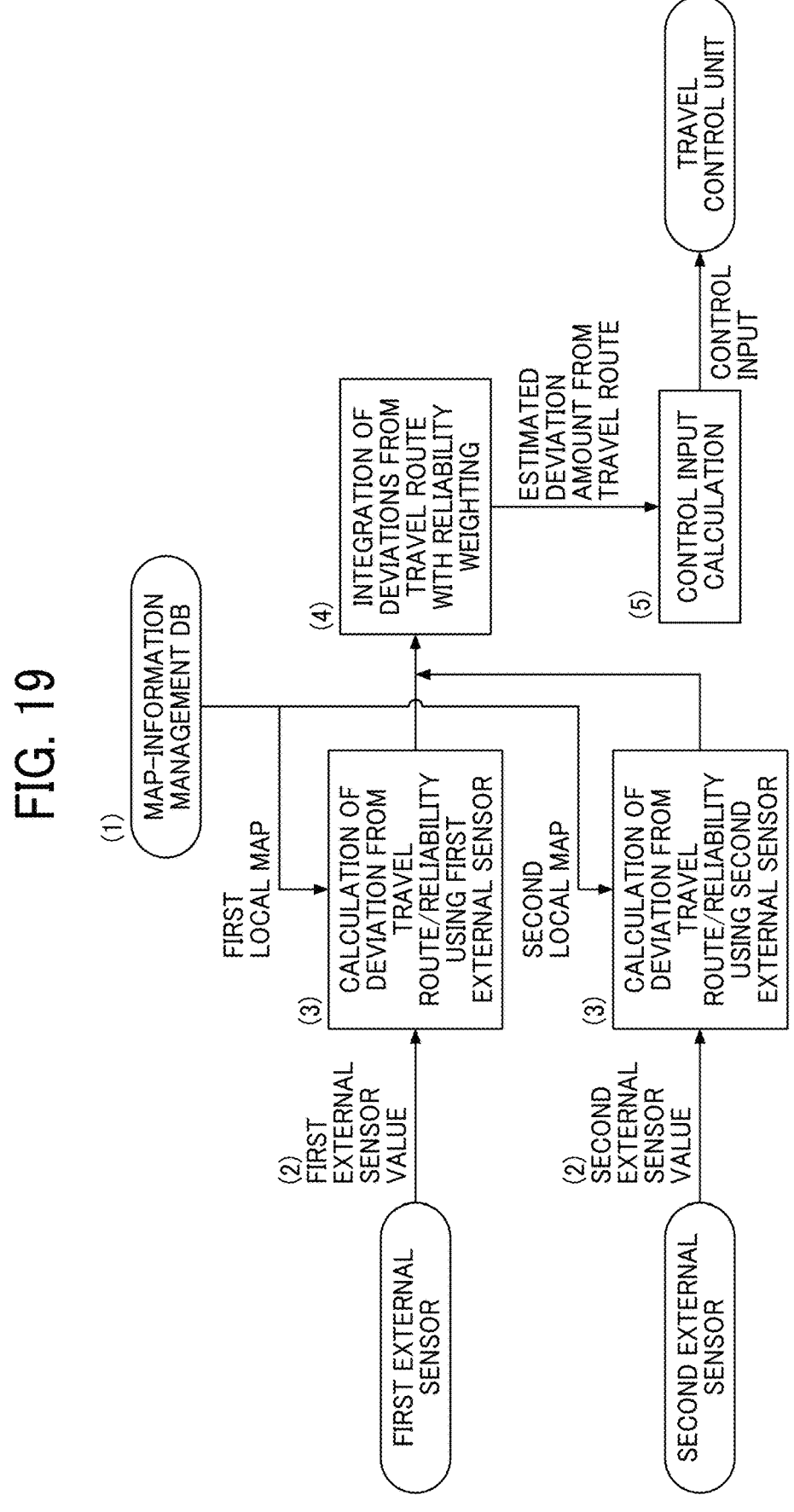
FIG. 19 is a block diagram illustrating travel control using an external sensor and a local map according to an embodiment.

FIG. 19 is a block diagram illustrating travel control using an external sensor and a local map according to the present embodiment. FIG. 19 illustrates the travel control in the autonomous travel phase.

(1) First, the storage device stores the first local map and the second local map generated in the route teaching phase by the sensor values output from the first external sensor and the second external sensor. The first external sensor and the second external sensor are, for example, two of the navigation satellite system (GNSS) 114, the range sensor (LiDAR) 112 or 113, and the camera 111.

(2) In the autonomous travel phase, the first external sensor and the second external sensor each detect a sensor value. The internal sensor (e.g., the IMU 115) also detects a sensor value. The sensor value of the internal sensor is integrated with the sensor value of the first external sensor or the second external sensor to calculate the position and posture.

(3) The mobile robot 10 compares the first local map with the sensor value of the first external sensor and calculates the deviation from the travel route using the first external sensor (a deviation from the node). The mobile robot 10 compares the second local map with the sensor value of the second external sensor and calculates the deviation from the travel route using the second external sensor (a deviation from the node). As will be described later, the deviation from the node represents the position and posture of the waypoint 8 as viewed from the mobile robot 10. The mobile robot 10 calculates the reliability of the first external sensor based on the first local map and the first external sensor, and calculates the reliability of the second external sensor based on the second local map and the second external sensor.

(4) The mobile robot 10 weights the position and posture detected by the mobile robot 10 with the reliability, and integrates the position and posture detected by the first external sensor and the position and posture detected by the second external sensor. Since the positions and postures to be integrated are the deviations from the travel route, integrating the positions and postures is equivalent to integrating the deviations from the travel route.

(5) The mobile robot 10 controls the travel using the integrated position and posture in which the positions and postures detected by the multiple external sensors are integrated.

Processing in Route Teaching Phase

Figure 20:
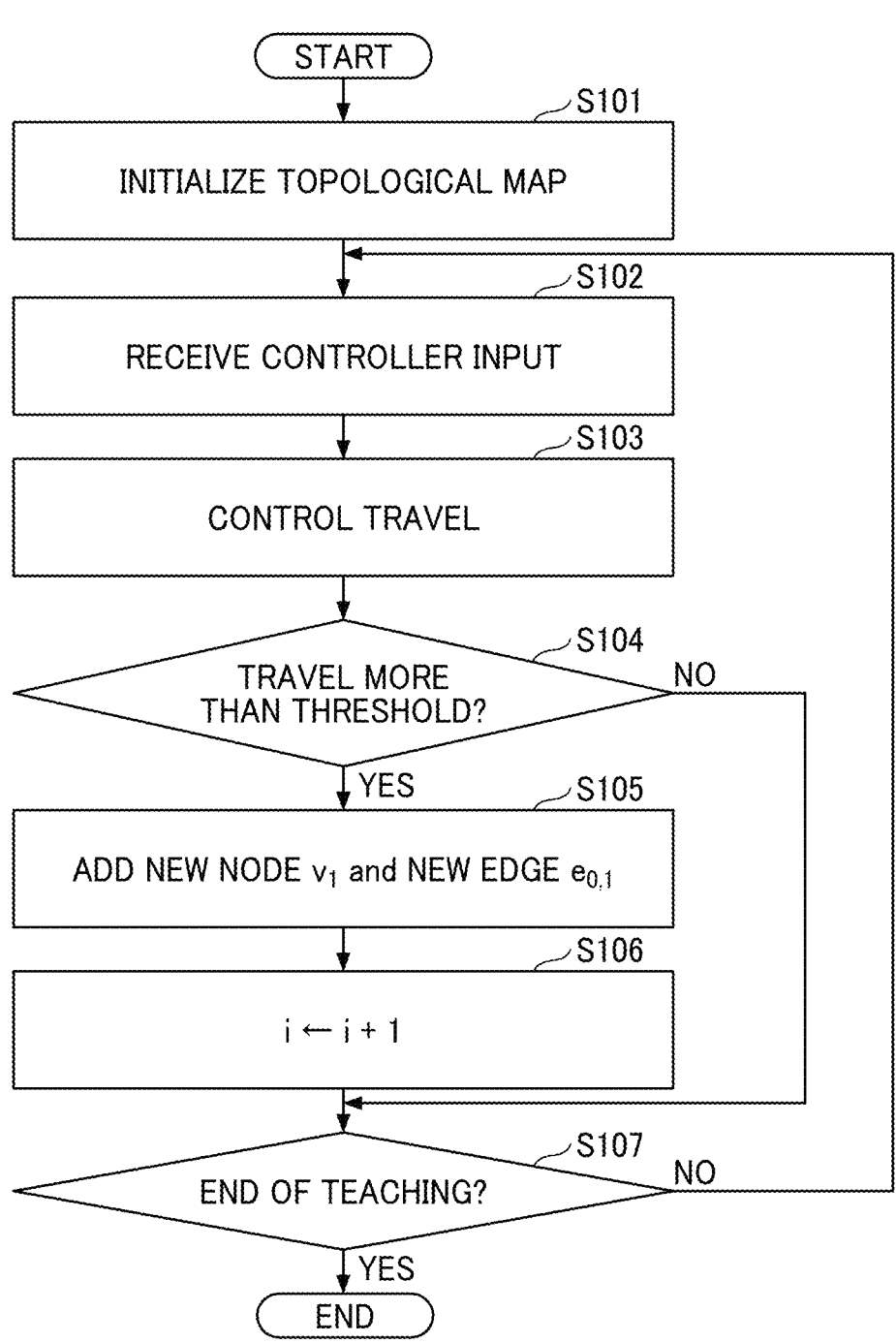
FIG. 20 is a flowchart of an example process of a route teaching phase.

The route teaching phase will be described in detail with reference to FIGS. 20 and 21. FIG. 20 is a flowchart of the process of the route teaching phase. This process is executed in step S16 of FIG. 10.

First, the map-information generation unit 46 initializes a topological map G by setting both the node set V and the edge set E to be empty (S101). The map-information generation unit 46 sets a k-th sensor value of the external sensor or a k-th local map generated using the external sensor as $m^k$. The map-information generation unit 46 adds the first node $v_0$ to the node set V at the start of the route teaching phase. All $$m^k(=:m_i^k)$$

at that time are stored in the node $v_0$.

The transmission-reception unit 31 receives a manual-operation command of the manual control of the mobile robot 10 by the operator (S102). The travel control unit 40 controls the mobile robot 10 to travel according to a drive instruction from the manual-operation processing unit 44 (S103).

The determination unit 32 periodically determines whether the mobile robot 10 has moved by a certain distance or more or turned by a certain angle or more (S104). The certain distance is set, for example, in accordance with the processing load, the memory usage, and the accuracy of the position and the route and may be, for example, 1 meter to several meters.

When it is determined YES in step S104, the map-information generation unit 46 adds a new node $v_1$ to the node group V and adds a new edge $e_{0,1}$ to the edge group E (S105). In the edge $e_{0,1}$, the relative travel amount and the relative turning amount acquired by the internal sensor from the time of the addition of the initial node $v_0$ are stored. The position of the node $v_i$ is referred to as the waypoint 8 in FIGS. 1 and 2. The map-information generation unit 46 increases the number "i" of the node by one (S106).

For example, until the route teaching phase is finished by the operation of the operator (No in S107), the map-information generation unit 46 adds the node $v_i$ and the edge $e_{i-1,i}$ each time the mobile robot 10 moves by the certain distance or more or turns by the certain angle or more in the similar manner.

The node set V and the edge set E can be expressed as $G=\{V, E\}$ $V=\{v_0, \ldots, v_n\}$ $E=\{e_{0,1}, \ldots, e_{n-1,n}\}$ $v_i=\{m_i^0, \ldots, m^{iN}\}$ $e_{i-1,i}=\{\Delta x_{i-1,i}, \Delta y_{i-1,i}, \Delta\theta_{i-1,i}\}$.

Processing in Autonomous Travel Phase

Figure 21:
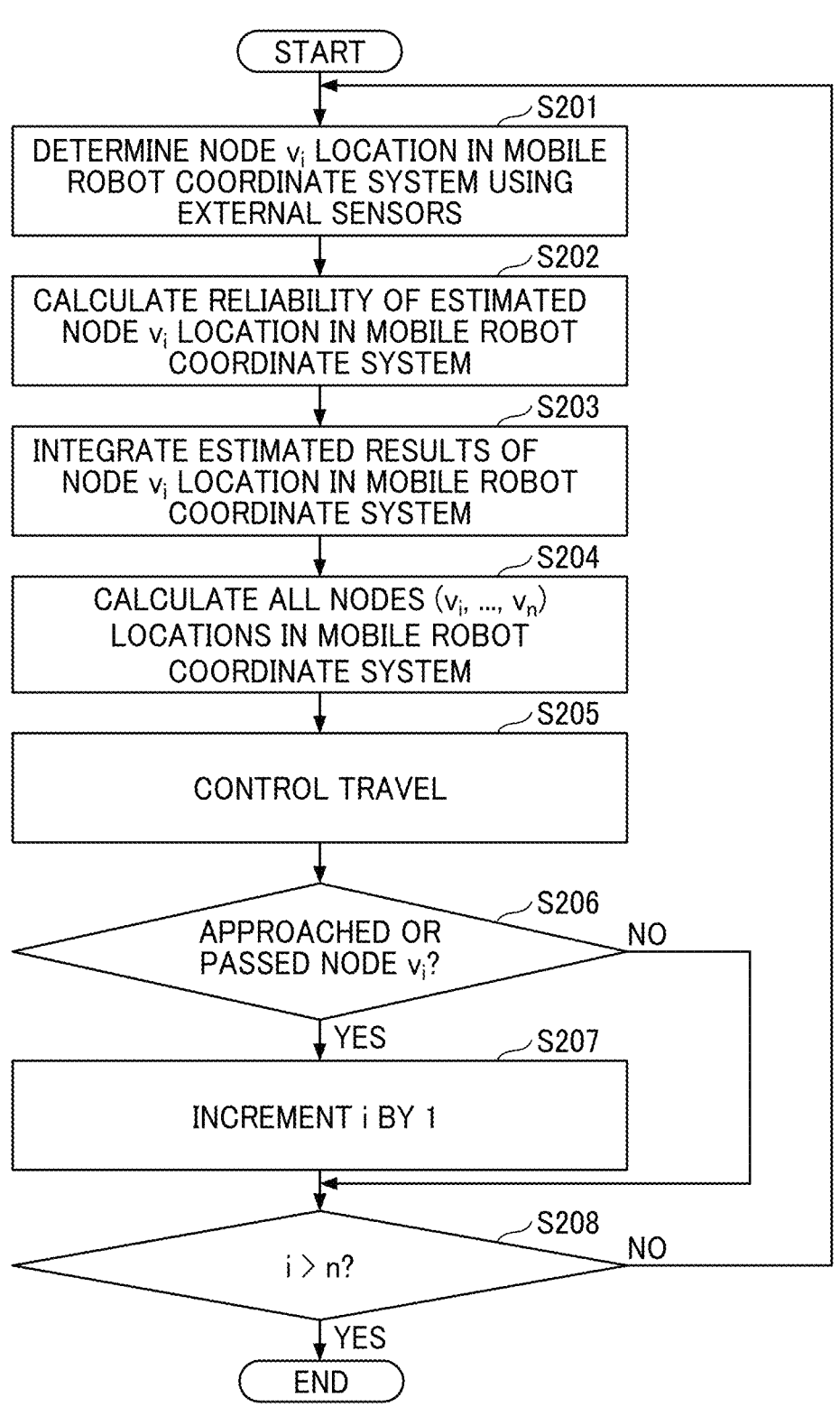
FIG. 21 is a flowchart of an example process of an autonomous travel phase.

FIG. 21 is a flowchart of the process of the autonomous travel phase. This process is executed in step S79 of FIG. 14.

Before the start of autonomous travel, the mobile robot 10 is placed at the start point. The k-th sensor value of the external sensor in the autonomous travel phase is referred to as a sensor value $s^k$. A specific calculation method of steps S201 to S203 and S206 will be described later.

S201: The deviation calculation unit 43b calculates the deviation of the position and posture of the node $v_i$ viewed from the mobile robot 10 based on the k-th sensor value $s^k$ of the external sensor in the autonomous travel of the mobile robot 10 and the k-th local map $m_i^k$ stored in the certain node $v_i$ in the teaching travel of the mobile robot 10. Since the position and posture of the node vi as viewed from the mobile robot 10 are the position and posture of the node $v_i$ from the position and posture of the mobile robot 10 being the origin, the position and posture of the node $v_i$ with reference to the position and posture of the mobile robot 10 are the deviation of the position and posture of the node $v_i$. The position estimation unit 43c estimates (determines) the calculated deviation as the position and posture $$x^{\wedge k}_i = \{x^{\wedge k}_i, y^{\wedge k}_i, \theta^{\wedge k}_i\}$$

of the node $v_i$ with reference to the position and posture of the mobile robot 10. Note that although "^" represents a hat, "^" is not directly above x but at the upper right due to font restrictions. An arithmetic device for performing this operation is represented as an arithmetic device $$F_k:(s_k, m_i^k) \to x^{\wedge k}_i.$$

By contrast, since the accuracy of the local map $$m_i^k$$

and the k-th sensor value $s^k$ of the external sensor is unknown, $$x^{\wedge k}_i$$

is integrated according to the reliability as described below.

S202: The integration unit 43d calculates the estimated reliability $$b_i^k$$

for the arithmetic device $F_k$. An arithmetic device that performs this operation is represented as an arithmetic unit $$B_k:(s_k, m_i^k) \to b_i^k.$$

S203: The integration unit 43d weights the position and posture $$x_i^k$$

of the node $v_i$ estimated by each external sensor based on the reliability and integrates the weighted positions and postures. An arithmetic device that performs this arithmetic operation is represented as an arithmetic device $$I:(x_i^{\wedge 0}, \ldots, x_i^{\wedge N}, b_i^0, \ldots b_i^N) \to x_i^{\wedge}.$$

Since the position and posture $$x_i^k$$

of the node $v_i$ are deviations of the position and posture of the mobile robot 10 from the origin (node) of the local map $$m_i^k,$$

the integration of the position and posture $$x_i^k$$

of the node $v_i$ includes integration of the deviations.

S204: The autonomous travel unit 43 calculates a taught travel route (that is, the position and posture of each node $v_j$) in the mobile robot coordinate system from the position and posture $x_i$ of the node $v_i$ and the relative position $\{\Delta x_{j-1,i}, \Delta_{yj-1,j}, \Delta\theta_{j-1,j}\}$ between the nodes stored in each edge. An arithmetic device that performs this operation is represented as an arithmetic device $T:x_i, e_{0,1}, \ldots, e_{n-1,n}) \to (x_0, \ldots, x_n)$." The calculated travel route is a travel route passing through the node $v_i$ and the subsequent nodes with the position and posture of the node $v_i$ as the origin. As a result, every time the mobile robot 10 passes through the node $v_i$, the travel route after the node $v_i$ in which the deviation at the node $v_i$ is reduced is recalculated. Accordingly, the mobile robot 10 can travel on the travel route with a reduced deviation from the taught travel route.

S205: The calculation unit 43a applies to, for example, the Kalman filter the position and posture obtained by integrating the sensor values of the internal sensor with the integrated position and posture of the node $v_i$ as the origin and the position and posture based on the sensor values $s^k$ of the multiple external sensors, thereby calculating the position and posture. The autonomous travel unit 43 controls the mobile robot 10 to travel on the taught travel route $(x^\wedge_0, \ldots, x^\wedge_n)$ in the mobile robot coordinate system calculated in step S204 based on the current position and posture of the mobile robot 10.

S206: The autonomous travel unit 43 determines whether to advance the node number i of the position and posture estimation target to the next node number, depending on whether the position and posture of the mobile robot 10 is within a threshold distance from the position and posture $x^\wedge_i$ of the node $v_i$ on the taught travel route $(x^\wedge_0, \ldots, x^\wedge_n)$. A determination device that performs this determination is represented as a determination device $J::(x^\wedge_i, (x^\wedge_0, \ldots, x^\wedge_n)) \to 0$ (i is not advanced) or 1 (i is advanced).

S207: The travel control unit 40 sets i to 0 at the start of the autonomous travel and increments i by one.

S208: The travel control unit 40 repeats the process of FIG. 21 until i becomes larger than the number of nodes n. The number of nodes n is the number of nodes stored up to the final destination.

In steps S201 to S204 in FIG. 21, the taught travel route in the mobile robot coordinate system is calculated. The mobile robot 10 travels on the taught travel route (S205). Then, the mobile robot 10 increment i by 1 according to the result of step S201 while performing the iterative calculation in steps S206 to S205. By repeating this, the mobile robot 10 can travel on the taught travel route.

Example Processing Using GNSS and 2D LiDAR

Detailed examples of steps S201 to S203 and S206 in the autonomous travel phase will be described.

The reference sign "$m_i^0$" represents the position and posture estimated from a GNSS measurement history and odometry by the internal sensor, and a measurement state (good/bad). The reference sign "$m_i^1$" is a two-dimensional occupancy grid map of the mobile robot coordinate system generated from a history of scanning point cloud of a 2D LiDAR and the odometry by the internal sensor. The reference sign "$s^0$" represents the position and posture estimated from a GNSS measurement history and odometry by the internal sensor, and a measurement state. The reference sign "$s^1$" represents a scanning point cloud of the 2D LiDAR.

S201: The arithmetic device $F_0$ compares the positions and the postures by the GNSS position measurement results of $m_i^0$ and $s^0$ to calculate the position and posture $$x_i^{\wedge 0}$$

of the node vi as viewed from the mobile robot 10. It is assumed that $m_i^0$ represents the position and posture $(x_{i,GNSS}, y_{i,GNSS}, \theta_{i,GNSS})$ of the node $v_i$ in the GNSS coordinate system, and $s_0$ represents the position and posture $(x_{GNSS}, y_{GNSS}, \theta_{GNSS})$ of the mobile robot 10 in the GNSS coordinate system in the autonomous travel. At this time, the position and posture of the node $v_i$ as viewed from the mobile robot 10 is calculated by Expressions 1 and 2. The calculation by Expressions 1 and 2 corresponds to the arithmetic device $F_0$.

Expression 1

$$\begin{pmatrix} \hat{x}_i^0 \\ y_i^0 \end{pmatrix} = \begin{pmatrix} \cos(\theta_{GNSS}) & \sin(\theta_{GNSS}) \\ -\sin(\theta_{GNSS}) & \cos(\theta_{GNSS}) \end{pmatrix} \begin{pmatrix} x_{i,GNSS} - x_{GNSS} \\ y_{i,GNSS} - y_{GNSS} \end{pmatrix} \quad (1)$$

Expression 2

$$\hat{\theta}_i^0 = \theta_{i,GNSS} - \theta_{GNSS} \quad (2)$$

As is clear from Expressions (1) and (2), the position and posture of the node $v_i$ as viewed from the mobile robot 10 is deviations of the position and posture of the mobile robot 10 in the GNSS coordinate system from the position and posture $(x_{i,GNSS}, y_{i,GNSS}, \theta_{i,GNSS})$ of the node vi in the GNSS coordinate system (an example of first position and posture).

Subsequently, the arithmetic device $F_1$ calculates the position and posture $$x_i^{\wedge 1}$$

of the node $v_i$ as viewed from the mobile robot 10 by matching calculation between the two-dimensional occupancy grid map of $m_i^1$ and the scanning point cloud of 2D LiDAR of $s^1$ (an example of second position and posture). It is assumed that $m_i^1$ represents a two-dimensional occupancy grid map with the node $v_i$ as the origin, and $s_1$ represents a LiDAR scanning point cloud $\{(x_j, y_j)j=1, \ldots, N\}$ (N is the number of scan points) of the mobile robot 10 in autonomous travel. At this time, the autonomous travel unit 43 finds a way of moving the two-dimensional occupancy grid map in the xy plane so that the sum of all the values of the grids corresponding to the points of the scanning point cloud (the grid having an obstacle has the value of 1) is the largest (that is, the scanning point cloud matches the map). Thus, the origin of the $m_i^1$ as viewed from the mobile robot 10 (i.e., the position and posture of the node $v_i$ in the two-dimensional occupancy grid map) can be obtained. This series of operations corresponds to the arithmetic device $F_1$.

FIGS. 22A and 22B are diagrams each schematically illustrating matching calculation between a two-dimensional occupancy grid map and a scanning point cloud of a 2D LiDAR. FIG. 22A illustrates a two-dimensional occupancy grid map 93 and a scanning point cloud 94 of the 2D LiDAR before matching. In the two-dimensional occupancy grid map 93, grids in which obstacles are present are indicated by oblique lines. The scanning point cloud 94 of the 2D LiDAR indicates the directions and distances of obstacles.

In FIG. 22B, the two-dimensional occupancy grid map 93 has been moved such that the grids in which the obstacles are present match most the scanning point cloud 94 of the 2D LiDAR. The amounts of movement and rotation in the x and y directions of the two-dimensional occupancy grid map 93 represent the deviations of the position and posture. Since the mobile robot 10 is supposed to be present at an origin 70 (=node $v_i$) of the two-dimensional occupancy grid map 93 in the state illustrated in FIG. 22B, the travel amount and the rotation amount in the x and y directions of the two-dimensional occupancy grid map 93 represent the position
and posture $x^1_i$ of the node $v_i$ as viewed from the mobile
robot 10.

S202: The estimated reliability $b_0$ is set to 1 only when the
GNSS position measurements of $m^0_i$ and $s^0$ are both "good,"
and is set to 0 otherwise. The estimated reliability $b_1$ is set
to 1 when the amount of obstacles in the two-dimensional
occupancy grid map of the $m^1_i$ is sufficiently large and the
number of scanning points of the scanning point cloud 94 of
$s^1$ is sufficiently large, and is set to 0 otherwise. The values
of the estimated reliabilities $b_0$ and $b_1$ are not limited to 1 or
0 and may be any suitable values according to the accuracy
of the local map and the sensor value. For example, the
GNSS position measurement states of $m^0_i$ and $s^0$ are evalu-
ated in N stages, and the total is set as the estimated
reliability $b_0$. The amount of obstacles in the two-dimen-
sional occupancy grid map and the number of scanning
points of the scanning point cloud 94 are evaluated in N
stages, and the total is set as the estimated reliability $b_1$.

S203: When either the estimated reliability $b^0_i$ or $b^1_i$ is not
0, $$I(x^0_i, x^1_i, b^0_i, b^1_i) = (b^0_i x^0_i + b^1_i x^1_i)/(b^0_i + b^1_i).$$

When the estimated reliability $$b^0_i = b^1_i = 0,$$

the position and posture based on the previous estimation
result of the position and posture of the node $v_i$ and the
odometry by the internal sensor is set as the estimation result
(dead reckoning).

S206: When the difference of $\hat{x}_i=\{\hat{x}_i, \hat{y}_i, \hat{\theta}_i\}$ integrated
in step S203 from $$\sqrt{(\hat{x}^2_i + \hat{y}^2_i)}$$

is larger than a threshold value, the value is set to 0, and
when the difference is smaller than the threshold value, the
value is set to 1. The reference $\hat{x}_i$ and $\hat{y}_i$ represent the
current location of the mobile robot 10 calculated by the
calculation unit 43a.

Example Processing Using GNSS and 3D LiDAR

A description is given of processing of the scanning point
cloud by a 2D LiDAR instead of the scanning point cloud by
a 3D LiDAR with reference to the flowchart of FIG. 21. As
a difference from the processing using a 2D LiDAR, detailed
examples of steps S201 to S203 and S206 in the autonomous
travel phase will be described.

The reference sign "$m^0_i$" represents the position and
posture estimated from a GNSS measurement history and
odometry by the internal sensor, and a measurement state
(good/bad). The reference sign "$m^1_i$" is a three-dimensional
point cloud map of the mobile robot coordinate system
generated from a history of scanning point cloud of a 3D
LiDAR and the odometry by the internal sensor. The refer-
ence sign "$s^0$" represents the position and posture estimated
from a GNSS measurement history and odometry by the internal sensor, and a measurement state. The reference sign
"$s^1$" represents a scanning point cloud of the 3D LiDAR.

S201: The arithmetic device $F_0$ compares the positions
and the postures by the GNSS position measurement results
of $m^0_i$ and $s^0$ to calculate the position and posture $$x^0_i$$

of the node $v_i$ as viewed from the mobile robot 10. It is
assumed that $m^0_i$ represents the position and posture
$(x_{i,GNSS}, y_{i,GNSS}, \theta_{i,GNSS})$ of the node $v_i$ in the GNSS
coordinate system, and $s_0$ represents the position and posture
$(x_{GNSS}, y_{GNSS}, \theta_{GNSS})$ of the mobile robot 10 in the GNSS
coordinate system in the autonomous travel. At this time, the
position and posture of the node vi as viewed from the
mobile robot 10 is calculated by the above Expressions 1 and
2. The calculation by Expressions 1 and 2 corresponds to the
arithmetic device $F_0$.

As is clear from Expressions (1) and (2), the position and
posture of the node $v_i$ as viewed from the mobile robot 10
is deviations of the position and posture of the mobile robot
10 in the GNSS coordinate system from the position and
posture $(x_{i,GNSS}, y_{i,GNSS}, \theta_{i,GNSS})$ of the node vi in the GNSS
coordinate system (an example of first position and posture).

Subsequently, the arithmetic device $F_1$ calculates the
position and posture $$x^1_i$$

of the node $v_i$ as viewed from the mobile robot 10 by
matching calculation between the three-dimensional point
cloud map of $m^1_i$ and the scanning point cloud of 3D LiDAR
of $s^1$ (an example of second position and posture). It is
assumed that $m^1_i$ represents a three-dimensional point cloud
map with the node $v_i$ as the origin, and $s_1$ represents a 3D
LiDAR scanning point cloud $\{(x_j, y_j)j=1, \ldots, N\}$ (N is the
number of scan points) of the mobile robot 10 in autono-
mous travel. At this time, the autonomous travel unit 43 finds
a way of moving the three-dimensional point cloud map to
minimize an error from the scanning point cloud by, for
example, NDT matching (see P. Biber & W. Strasser. "The
normal distributions transform: a new approach to laser scan
matching," *Proceedings* 2003 *IEEE/RSJ International Con-
ference on Intelligent Robots and Systems* (*IROS* 2003) (Cat.
No.03CH37453)). Thus, the origin of the $m^1_i$ as viewed from
the mobile robot 10 (i.e., the position and posture of the node
$v_i$ in the two-dimensional occupancy grid map) can be
obtained. This series of operations corresponds to the arith-
metic device $F_1$.

S202: The estimated reliability $b_0$ is set to 1 only when the
GNSS position measurements of $m^0_i$ and $s^0$ are both "good,"
and is set to 0 otherwise. The estimated reliability $b_1$ is set
to 1 when the amount of obstacles in the field of view of the
3D LiDAR on the three-dimensional point cloud map of the
$m^1_i$ is sufficiently large, and is set to 0 otherwise. However,
the autonomous travel unit 43 performs the following pro-
cessing when calculating the amount of obstacles.

FIG. 23 is a flowchart of a process of the estimated
reliability $b_0$ evaluation based on the amount of obstacles. As
illustrated in FIG. 23, the autonomous travel unit 43 per-
forms pre-processing at the start of the autonomous travel.
Specifically, at the reading of the point cloud map (step S1),
the autonomous travel unit 43 removes ground point clouds (step S2) and converts the point cloud map into the two-dimensional occupancy grid map (step S3). The ground removal of is performed, for example, as follows. The tilt of the mobile robot 10 is detected by using an internal sensor, and a ground plane is defined. The distance from the ground plane to each point in the point cloud map is calculated, and a point within a threshold value is determined as the ground and is removed.

The autonomous travel unit 43 calculates the relative position and posture of the mobile robot 10 in the two-dimensional occupancy grid map as viewed from the mobile robot 10 in the autonomous travel (step S4). The autonomous travel unit 43 calculates the amount of obstacles in the field of view of the 3D LiDAR based on the number of occupied grids (step S5). The autonomous travel unit 43 normalizes the amount of obstacles by the outer circumferential length of the two-dimensional occupancy grid map (step S6). The autonomous travel unit 43 evaluates the estimated reliability $b_0$ by the normalized amount of obstacles (step S7). The estimated reliability $b_0$ is set to 1 when the normalized amount of obstacles is larger than the threshold, and otherwise, the estimated reliability $b_0$ is set to 0. The reason why the amount of obstacles is normalized is to eliminate the dependency on the range (size) of the point cloud map. The values of the estimated reliabilities $b_0$ and $b_1$ are not limited to 1 or 0 and may be any suitable values according to the accuracy of the local map and the sensor value. For example, the GNSS position measurement states of $m_i^0$ and $s^0$ are evaluated in N stages, and the total is set as the estimated reliability $b_0$. The amount of obstacles on the three-dimensional point cloud map and the number of scanning points of the scanning point cloud 94 are evaluated in N stages, and the total is set as the estimated reliability $b_1$.

S203: When either the estimated reliability $b_i^0$ or $b_i^1$ is not 0, $$I\left(x_{i^\wedge}^0, x_{i^\wedge}^1, b_i^0, b_i^1\right) = \left(b_i^0 x_{i^\wedge}^0 + b_i^1 x_{i^\wedge}^1\right) \Big/ \left(b_i^0 + b_i^1\right).$$

When the estimated reliability $b_i^0=b_i^1=0$, the position and posture based on the previous estimation result of the position and posture of the node $v_i$ and the odometry by the internal sensor is set as the estimation result (dead reckoning).

S206: When the difference of $$x^{\wedge i} = \left\{x^{\wedge i}, y^{\wedge i}, \theta^{\wedge i}\right\}$$

integrated in step S203 from $$\sqrt{\left(\Lambda_i^2 + y_i^{\wedge 2}\right)}$$

is larger than a threshold value, the value is set to 0, and when the difference is smaller than the threshold value, the value is set to 1. The reference $x_i^\wedge$ and $y_i^\wedge$ represent the current location of the mobile robot 10 calculated by the calculation unit 43*a*.

The mobile robot 10 according to the present embodiment has a local map in a topological map format independently for each sensor. The mobile robot 10 calculates the reliability of estimation of self-position and self-posture, which are independently estimated for each independent local map, based on the sensor values obtained in teaching travel and autonomous travel. The mobile robot 10 then integrates the self-positions and self-postures into the final position and posture with weighting according to the reliability. This obviates the necessity to manually correct the map to make the respective position estimation results by the sensors consistent. Accordingly, even if the positioning accuracy of any of the sensors is reduced in the route teaching phase, highly accurate autonomous travel can be achieved.

The reliability calculation when a 3D LiDAR is used has the following two advantages.

Since the map point cloud is used instead of the real-time point cloud for the calculation of the reliability (the amount of obstacles around the mobile robot 10) for the map matching, the pre-processing for the reliability calculation can be executed in advance.

In other words, the real-time calculation load is small.

When the reliability is calculated by viewing the real-time point cloud, the reliability is increased by an obstacle (such as a vehicle or a person) temporarily passing by the mobile robot 10, and an erroneous localization result may be adopted. However, when the map point cloud is used, there is no such a concern.

Second embodiment A description is given of a second embodiment in which the display apparatus 60 is a head mounted display (HMD). The HMD is a kind of display apparatus that is worn on the head so as to cover both eyes with two displays in a goggle-like shape. The HMD displays parallax images to the left and right eyes that lead to stereoscopic view. Providing stereoscopic view is not a requisite.

In addition to HMDs that simply provide stereoscopically view of videos, there are various types of HMDs such as an HMD called virtual reality (VR) headset (goggles), augmented reality (AR) headset, or mixed reality (MR) headset. A VR headset displays an artificial virtual world. An AR headset reads the real world stereoscopically and displays virtual information superimposed on the real world. An MR headset is an extension of the AR headset and displays an object which is not actually present in the real world in a three-dimensional manner. In the present embodiment, since the operator browses with the HMD the image data captured by the mobile robot 10, a simple HMD or AR headset would be used.

Figure 24:
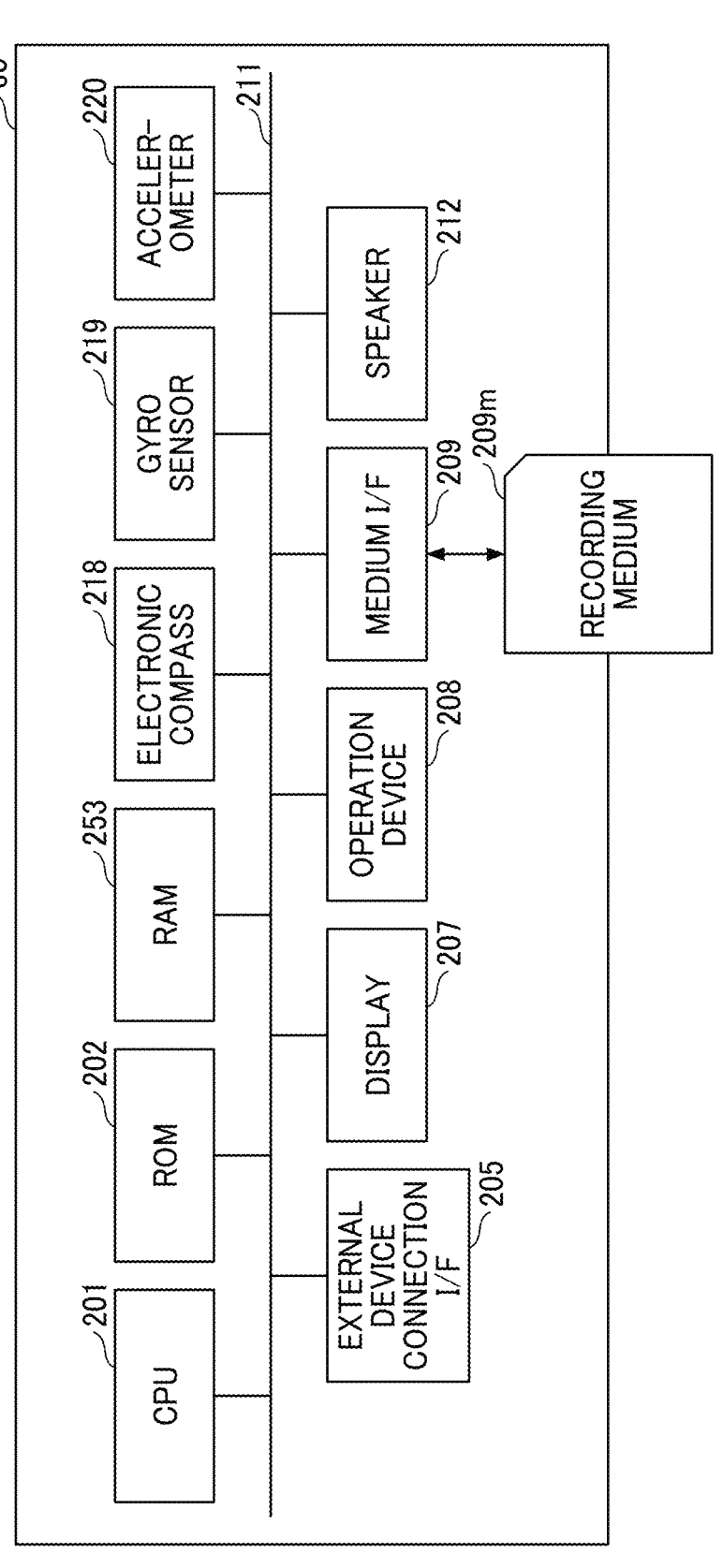
FIG. 24 is a block diagram illustrating an example of a hardware configuration of a head mounted display (HMD) used as the display apparatus.

FIG. 24 is a block diagram illustrating an example of the hardware configuration of an HMD used as the display apparatus 60. As illustrated in FIG. 24, the display apparatus 60 which is an HMD has a configuration of a computer. The display apparatus 60 includes a CPU 201, a ROM 202, a RAM 203, an external device connection I/F 205, a display 207, an operation device 208, a medium I/F 209, a bus line 211, a speaker 212, an electronic compass 218, a gyro sensor 219, and an accelerometer 220.

The CPU 201 controls the entire operation of the HMD. The ROM 202 stores a program such as an initial program loader (IPL) to boot the CPU 201. The RAM 203 is used as a work area for the CPU 201.

The external device connection I/F 205 is an interface for connecting various external devices. The external device in this case is, for example, a communication management server 3 or an earphone 6 having a microphone.

The display 207 is a display apparatus such as a liquid crystal display or an organic EL display that displays various images.

The operation device 208 is an input means operated by an operator to, for example, select or execute various instructions, select a target for processing, or move a cursor being displayed. Examples of the input means include various operation buttons, a power switch, a physical button, and a line-of-sight operation circuit that operates in response to detection of the line of sight of the operator.

The medium I/F 209 controls the reading or writing (storing) of data from or to a recording medium 209*m* such as a flash memory. Examples of the recording medium 209*m* include a DVD and a BLU-RAY DISC.

The speaker 212 is a circuit that converts an electric signal into physical vibration to generate sound such as music or voice. The electronic compass 218 calculates the direction of the HMD from the Earth's magnetism and outputs direction information. The gyro sensor 219 detects a change in angle (roll, pitch, and yaw) of the HMD as the HMD moves.

The accelerometer 220 is a sensor that detects acceleration in triaxial directions. Examples of the bus line 211 include an address bus and a data bus, which electrically connect the components including the CPU 201 one another.

The display apparatus 60 according to the present embodiment can detect the posture of the display apparatus 60 by the signal of the gyro sensor 219 and thus can identify the direction in which the operator is viewing. The camera 111 can capture a spherical image, a wide-angle image, or a hemispherical image. Accordingly, the display apparatus 60 can display the direction in which the operator is viewing on the display 207 of the HMD. This makes it easier for the operator to view various directions compared with operating the area displayed in the site display area 210 with the pointing device 512 such as a mouse.

The position of the mobile robot 10 when the operator is viewing in a certain direction with the HMD is identified by the state detection unit 34. Accordingly, the display apparatus 60 can display annotation of an object such as a building present in the direction of view of the operator from the position of the mobile robot 10 in a manner superimposed on the image data transmitted from the mobile robot 10. In this case, for example, the system administrator sets annotation of the building using the environment map generated by the mobile robot 10.

Figure 25:
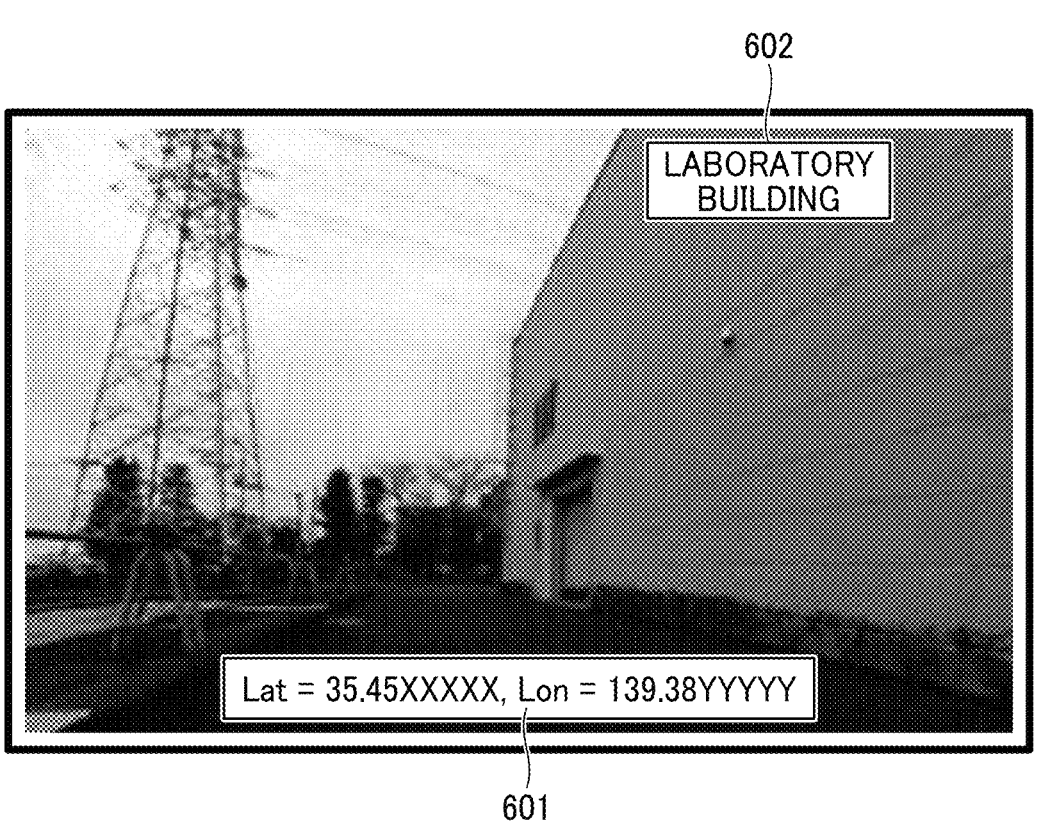
FIG. 25 is a diagram illustrating an example of image data displayed by the HMD illustrated in FIG. 24 used as the display apparatus.

FIG. 25 illustrates an example of image data displayed by the HMD used as the display apparatus 60. In the image data of FIG. 25, a current position 601 of the mobile robot 10 and a name 602 "laboratory building" of the building in the image data are indicated. The mobile robot 10 receives the direction in which the operator is viewing from the display apparatus 60 and identifies on the environment map a building present in the direction in which the operator is viewing from the position of the mobile robot 10. The image-capture control unit 33 superimposes information such as the current position and the name of the building on the captured image data, and the transmission-reception unit 31 transmits the image data to the display apparatus 60. As the annotation, in addition to the name 602 of the building, the contents of accidents that occurred in the past, and events to be observed with caution may be displayed. Accordingly, the operator can easily grasp which direction the operator is viewing and what the operator is viewing.

The mobile robot 10 of the present embodiment provides effects similar to those of the first embodiment or the second embodiment. Further, the use of an HMD as the display apparatus 60 is advantageous in that the operator can easily view the image data captured by the mobile robot 10.

Although the example embodiments of the present disclosure are described above, the above-described embodiments are not intended to limit the scope of the present invention. Thus, numerous modifications and replacements of elements are possible within the scope of the present invention.

For example, in the above-described embodiments, two positions and postures obtained using two external sensors are integrated, but three or more positions and postures obtained using three or more external sensors may be integrated.

The technology according to the present disclosure is effective in a vast place where the GNSS positioning accuracy is not necessarily high but can be suitably applied to a narrow indoor environment and a place where the GNSS positioning accuracy is high.

Further, position information by UWB (Ultra-Wideband) as an example of the external sensor may be used. In a UWB system, a communication tag is attached to the mobile robot 10, and sensors are installed at intervals of 30 m to 40 m in the travel environment of the mobile robot 10. The location of the communication tag can be identified by two or more sensors receiving the radio waves transmitted by the communication tag.

In the configuration illustrated in, for example, FIG. 6, processing units are divided into blocks in accordance with the main functions in order to facilitate the understanding the processing by the mobile robot 10 and the display apparatus 60. No limitation is intended to how the processing units are divided by the unit of process or by the name. The processing performed by the mobile robot 10 and the display apparatus 60 may be divided into a greater number of processing units depending on the content of the processing. Further, a single processing unit can be divided into multiple processing units.

Each of the functions of the above-described embodiments may be implemented by one or more processing circuits or circuitry. The "processing circuit or circuitry" in the present specification includes a programmed processor to execute each function by software, such as a processor implemented by an electronic circuit, and devices, such as an application specific integrated circuit (ASIC), a digital signal processor (DSP), a field programmable gate array (FPGA), and/or combinations thereof which are configured or programmed, using one or more programs stored in one or more memories to perform the disclosed functionality.

The embodiments of the present disclosure can provide significant improvements in computer capability and functionality. These improvements allow operators to take advantage of computers that provide more efficient and robust interaction with tables that is a way to store and present information on information processing apparatuses. In addition, the embodiments of the present disclosure can provide a better operator experience through the use of a more efficient, powerful, and robust user interface. Such a user interface provides a better interaction between a human and a machine.

Aspect 1

A mobile apparatus performs teaching travel in which the mobile apparatus stores a position and posture while traveling on a travel route under control by a manual operation of an operator and autonomous travel in which the mobile apparatus travels the stored position in the stored posture. The mobile apparatus includes an information generation unit, a deviation calculation unit, a position estimation unit, an integration unit, and an autonomous travel unit.

The information generation unit generates calculation information used for calculating a deviation between a node passed in the teaching travel and a point passed in the autonomous travel. The information generation unit generates the calculation information for each node on the travel route independently for multiple external sensors, in association with the node and the external sensor.

The deviation calculation unit calculates, for each node independently for the multiple external sensors, the deviation based on the calculation information and a sensor value of the external sensor obtained in the autonomous travel.

The position estimation unit determines, for each node independently for the multiple external sensors, the calculated deviation as a position and posture of the node on the travel route with reference to the position and posture of the mobile apparatus.

The integration unit integrates, for each node, the positions and postures of the node on the travel route determined independently for the multiple external sensors.

The autonomous travel unit controls the mobile apparatus to autonomously travel on the travel route based on the position and the posture of the node on the travel route integrated by the integration unit.

Aspect 2

The mobile apparatus of Aspect 1 further includes one or more internal sensors to detect a travel amount and a travel direction of the mobile apparatus.

The information generation unit uses a sensor value of the one or more internal sensors in generating the calculation information, and, in the teaching travel, stores the calculation information in the storage unit in association with the external sensor for each node on the travel route.

Aspect 3

In the mobile apparatus of Aspect 1 or 2, in integrating the positions and postures of the node with reference to the position and posture of the mobile apparatus determined independently for the multiple external sensors, the integrated processing unit weights the positions and postures of the node based on reliability of the calculation information and reliability of respective sensor values of the multiple external sensors in the autonomous travel.

Aspect 4

In the mobile apparatus of any one of Aspects 1 to 3, when the integration unit integrates the positions and postures of a first node determined independently for the multiple external sensors, the autonomous travel unit calculates a position and posture of a second node subsequent to the first node based on the integrated position and posture of the first node and relative position information between the first node and the second node included in the calculation information, and calculates a travel route whose origin is the position and posture of the mobile apparatus at the first node.

Aspect 5

In the mobile apparatus of any one of Aspects 1 to 4, the multiple external sensors are two or more of a GNSS, a 2D LiDAR, and a camera to obtain range information.

Aspect 6

In the mobile apparatus of Aspect 5, the calculation information is a position and posture of a GNSS coordinate system when the first external sensor is a GNSS, and the calculation information is a two-dimensional occupancy grid map when the second external sensor is a 2D LiDAR.

The position estimation unit determines, for the first external sensor, a deviation of the position and posture in the GNSS coordinate system indicated by a sensor value of the first external sensor in the autonomous travel from the position and posture of the GNSS coordinate system included in the calculation information, as a first position and posture of the node with reference to the position and posture of the mobile apparatus.

The position estimation unit compares the two-dimensional occupancy grid map with a scanning point cloud indicated by sensor values of the second external sensor the in autonomous travel, and determines, for the second external sensor, a deviation of the position and posture of the mobile apparatus from the origin of the two-dimensional occupancy grid map as a second position and posture of the node with reference to the position and posture of the mobile apparatus.

The integration unit integrates the first position and posture and the second position and posture.

Aspect 7

In the mobile apparatus of any one of Aspects 1 to 4, the multiple external sensors are two or more of a GNSS, a 3D LiDAR, and a camera to obtain range information.

Aspect 8

In the mobile apparatus of Aspect 7, the calculation information is a position and posture of a GNSS coordinate system when the first external sensor is a GNSS, and the calculation information is a three-dimensional point cloud map when the second external sensor is a 3D LiDAR.

The position estimation unit determines, for the first external sensor, a deviation of the position and posture in the GNSS coordinate system indicated by a sensor value of the first external sensor in the autonomous travel from the position and posture of the GNSS coordinate system included in the calculation information, as a first position and posture of the node with reference to the position and posture of the mobile apparatus.

The position estimation unit compares the three-dimensional point cloud map with a scanning point cloud indicated by sensor values of the second external sensor in the autonomous travel, and determines, for the second external sensor, a deviation of the position and posture of the mobile apparatus from the origin of the three-dimensional point cloud map as a second position and posture of the node with reference to the position and posture of the mobile apparatus.

The integration unit integrates the first position and posture and the second position and posture.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), and/or combinations thereof which are configured or programmed, using one or more programs stored in one or more memories, to perform he disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The invention claimed is:

1. A mobile apparatus comprising:
circuitry configured to:
control the mobile apparatus to perform teaching travel and autonomous travel on a travel route, the teaching travel in which the mobile apparatus stores in a memory a position and posture of the mobile apparatus traveling on the travel route under control by a manual operation, the autonomous travel in which the mobile apparatus autonomously travels on the travel route;
generate, for each of nodes on the travel route independently for each of multiple external sensors, calculation information used for calculating a deviation between a node passed in the teaching travel and a point passed in the autonomous travel;
store in the memory the calculation information in association with the node and each of the multiple external sensors;
calculate, for each node independently for each of the multiple external sensors, the deviation based on the calculation information and a sensor value of each of the multiple external sensors obtained in the autonomous travel;
determine, for each node independently for each of the multiple external sensors, the calculated deviation as a position and posture of the node on the travel route with reference to the position and posture of the mobile apparatus;
integrate, for each node, the positions and postures of the node determined independently for each of the multiple external sensors; and
control the mobile apparatus to autonomously travel on the travel route based on the integrated position and posture of each node on the travel route.

2. The mobile apparatus according to claim 1, further comprising:
one or more internal sensors to detect a travel amount and a travel direction of the mobile apparatus,
wherein the circuitry is configured to use a sensor value of the one or more internal sensors in generating the calculation information for each node on the travel route independently for each of the multiple external sensors.

3. The mobile apparatus according to claim 2, wherein:
the one or more internal sensors comprises at least one of an inertial measurement sensor, an encoder, a speed sensor, an accelerometer, or an angular velocity sensor.

4. The mobile apparatus according to claim 1, wherein:
in integrating the positions and postures of each node with reference to the position and posture of the mobile apparatus determined independently for each of the multiple external sensors, the circuitry is configured to weight the positions and postures of each node based on reliability of the calculation information and reliability of respective sensor values of the multiple external sensors acquired in the autonomous travel.

5. The mobile apparatus according to claim 4, wherein:
the multiple external sensors include a global navigation satellite system (GNSS) sensor, and
the reliability is based at least in part on a positioning accuracy status of the GNSS sensor.

6. The mobile apparatus according to claim 4, wherein:
the multiple external sensors include a light detection and ranging (LiDAR) sensor, and
the reliability is based at least in part on one of a LiDAR matching rate or a calculated amount of obstacles in the calculation information.

7. The mobile apparatus according to claim 1, wherein:
the nodes on the travel route includes a first node and a second node subsequent to the first node,
in a case where the circuitry integrates the positions and postures of the first node determined independently for each of the multiple external sensors, the circuitry is configured to:
calculate a position and posture of the second node based on the integrated position and posture of the first node and relative position information between the first node and the second node included in the calculation information; and
calculate a travel route whose origin is the position and posture of the mobile apparatus at the first node.

8. The mobile apparatus according to claim 7, wherein:
the relative position information stored in the memory comprises a relative travel amount and a relative turning amount between the first node and the second node, the relative travel amount and the relative turning amount being acquired from one or more internal sensors during the teaching travel.

9. The mobile apparatus according to claim 1, further comprising:
the multiple external sensors,
wherein the multiple external sensors are two or more of a global navigation satellite system ("GNSS"), a two-dimensional light detection and ranging sensor, and a camera that obtains range information.

10. The mobile apparatus according to claim 9, wherein;
the multiple external sensors include the GNSS as a first external sensor and the two-dimensional light detection and ranging sensor as a second external sensor,
the circuitry is configured to:
generate a position and posture in a GNSS coordinate system as the calculation information based on a sensor value of the first external sensor and generate a two-dimensional occupancy grid map as the calculation information based on sensor values of the second external sensor;
determine a deviation of the position and posture in the GNSS coordinate system based on the sensor value of the first external sensor in the autonomous travel from the position and posture of the GNSS coordinate system included in the calculation information as a first position and posture of the node with reference to the position and posture of the mobile apparatus;

compare the two-dimensional occupancy grid map with a scanning point cloud based on the sensor values of the second external sensor in the autonomous travel;

determine a deviation of the position and posture of the mobile apparatus from an origin of the two-dimensional occupancy grid map as a second position and posture of the node with reference to the position and posture of the mobile apparatus; and integrate the first position and posture and the second position and posture.

11. The mobile apparatus according to claim 10, wherein:

the circuitry is further configured to compare the two-dimensional occupancy grid map with the scanning point cloud by finding a transformation that maximizes a match score between the scanning point cloud and the two-dimensional occupancy grid map.

12. The mobile apparatus according to claim 1, further comprising:

the multiple external sensors, wherein the multiple external sensors are two or more of a global navigation satellite system ("GNSS"), a three-dimensional light detection and ranging sensor, and a camera that obtains range information.

13. The mobile apparatus according to claim 12, wherein;

the multiple external sensors include the GNSS as a first external sensor and the three-dimensional light detection and ranging sensor as a second external sensor, and the circuitry is further configured to:

generate a position and posture in a GNSS coordinate system as the calculation information based on a sensor value of the first external sensor and generate a three-dimensional point cloud map as the calculation information based on sensor values of the second external sensor;

determine a deviation of the position and posture in the GNSS coordinate system based on the sensor value of the first external sensor in the autonomous travel from the position and posture of the GNSS coordinate system included in the calculation information as a first position and posture of the node with reference to the position and posture of the mobile apparatus;

compare the three-dimensional point cloud map with a scanning point cloud based on the sensor values of the second external sensor in the autonomous travel;

determine a deviation of the position and posture of the mobile apparatus from an origin of the three-dimensional point cloud map as a second position and posture of the node with reference to the position and posture of the mobile apparatus; and integrate the first position and posture and the second position and posture.

14. The mobile apparatus according to claim 13, wherein:

the circuitry is further configured to compare the three-dimensional point cloud map with the scanning point cloud using a Normal Distributions Transform (NDT) matching algorithm.

15. The mobile apparatus according to claim 13, wherein:

the three-dimensional point cloud map generated as the calculation information is pre-processed to remove ground plane data.

16. The mobile apparatus according to claim 1, wherein:

the travel route is stored as a topological map comprising a plurality of nodes and a plurality of edges connecting the nodes, and the calculation information is stored in association with each of the plurality of nodes.

17. The mobile apparatus according to claim 1, wherein:

the manual operation is received from an operator at a remote control site via a communication network.

18. The mobile apparatus according to claim 1, wherein the circuitry comprises:

manual-operation processing circuitry configured to control the mobile apparatus during the teaching travel, and separate autonomous travel circuitry configured to control the mobile apparatus during the autonomous travel.

19. A method for determining a position of a mobile apparatus, the method comprising:

controlling the mobile apparatus to perform teaching travel in which the mobile apparatus stores in a memory a position and posture of the mobile apparatus traveling on a travel route under control by a manual operation;

generating, for each of nodes on the travel route independently for each of multiple external sensors, calculation information used for calculating a deviation between a node passed in the teaching travel and a point passed in autonomous travel, the autonomous travel being travel in which the mobile apparatus autonomously travels on the travel route;

storing in the memory the calculation information in association with the node and each of the multiple external sensors;

calculating, for each node independently for each of the multiple external sensors, the deviation based on the calculation information and a sensor value of each of the multiple external sensors obtained in the autonomous travel;

determining, for each node independently for each of the multiple external sensors, the calculated deviation as a position and posture of the node on the travel route with reference to the position and posture of the mobile apparatus;

integrating, for each node, the positions and postures of the node determined independently for each of the multiple external sensors; and controlling the mobile apparatus to autonomously travel on the travel route based on the integrated position and posture of each node on the travel route.

20. A non-transitory recording medium storing a plurality of program codes which, when executed by one or more processors, causes the one or more processors to perform a method, the method comprising:

controlling a mobile apparatus to perform teaching travel in which the mobile apparatus stores in a memory a position and posture of the mobile apparatus traveling on a travel route under control by a manual operation;

generating, for each of nodes on the travel route independently for each of multiple external sensors, calculation information used for calculating a deviation between a node passed in the teaching travel and a point passed in autonomous travel, the autonomous travel being travel in which the mobile apparatus autonomously travels on the travel route;

storing in the memory the calculation information in association with the node and each of the multiple external sensors;

calculating, for each node independently for each of the multiple external sensors, the deviation based on the calculation information and a sensor value of each of the multiple external sensors obtained in the autonomous travel;

determining, for each node independently for each of the multiple external sensors, the calculated deviation as a position and posture of the node on the travel route with reference to the position and posture of the mobile apparatus;

integrating, for each node, the positions and postures of the node determined independently for each of the multiple external sensors; and controlling the mobile apparatus to autonomously travel on the travel route based on the integrated position and posture of each node on the travel route.

* * * * *